(12) United States Patent
Ohno et al.

(10) Patent No.: US 7,641,955 B2
(45) Date of Patent: *Jan. 5, 2010

(54) HONEYCOMB STRUCTURED BODY AND EXHAUST GAS CONVERTING APPARATUS

(75) Inventors: Kazushige Ohno, Gifu (JP); Masafumi Kunieda, Gifu (JP); Kazutake Ogyu, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 115 days.

This patent is subject to a terminal disclaimer.

(21) Appl. No.: 11/296,494

(22) Filed: Dec. 8, 2005

(65) Prior Publication Data

US 2007/0004592 A1    Jan. 4, 2007

(30) Foreign Application Priority Data

Jun. 24, 2005    (WO) ............... PCT/JP2005/011647

(51) Int. Cl.
*B32B 18/00* (2006.01)
*B22F 3/105* (2006.01)

(52) U.S. Cl. .................... 428/116; 55/523; 419/41

(58) Field of Classification Search ............ 422/177, 422/168; 55/523; 428/116; 454/271; 502/439, 502/202

See application file for complete search history.

(56) References Cited

U.S. PATENT DOCUMENTS

| 5,098,763 | A  | 3/1992  | Horikawa et al. |
| 5,518,678 | A  | 5/1996  | Miyamoto et al. |
| 6,149,877 | A  | 11/2000 | Ogai |
| 6,669,751 | B1 | 12/2003 | Ohno et al. |
| 6,764,743 | B2 | 7/2004  | Kato et al. |
| 7,316,722 | B2 | 1/2008  | Komori et al. |

| 2003/0170160 | A1  | 9/2003 | Morita et al. |
| 2004/0014421 | A1* | 1/2004 | Raymer ............. 454/271 |
| 2004/0170803 | A1* | 9/2004 | Ichikawa ........... 428/116 |
| 2005/0016141 | A1* | 1/2005 | Hong et al. .......... 55/523 |

(Continued)

FOREIGN PATENT DOCUMENTS

DE    43 41 159 A1    6/1995

(Continued)

OTHER PUBLICATIONS

Mitsui abstract trans.*

(Continued)

*Primary Examiner*—Jennifer McNeil
*Assistant Examiner*—Lauren Robinson
(74) *Attorney, Agent, or Firm*—Finnegan, Henderson, Farabow, Garrett & Dunner LLP

(57) ABSTRACT

A honeycomb structured body comprising a pillar-shaped honeycomb block including a honeycomb unit in which a number of cells are longitudinally placed in parallel with a cell wall therebetween. The honeycomb unit comprising inorganic particles, as well as inorganic fibers and/or whiskers, and the inorganic fibers and/or whiskers increase a specific surface area of the honeycomb unit. A sealing material provided on a peripheral portion of the honeycomb block. Irregularities are formed on the peripheral face of the honeycomb structured body and the pillar-shaped honeycomb block. A least square curve is obtained by a least square method on the basis of points comprising the contour of a cross-section perpendicular to the longitudinal direction of the honeycomb structured body and the honeycomb block.

23 Claims, 10 Drawing Sheets

U.S. PATENT DOCUMENTS

| | | | |
|---|---|---|---|
| 2005/0025933 A1 | 2/2005 | Masukawa et al. | |
| 2005/0095179 A1 | 5/2005 | Kasai et al. | |
| 2005/0095395 A1 | 5/2005 | Miwa | |
| 2005/0227869 A1 | 10/2005 | Ohno et al. | |
| 2005/0229565 A1* | 10/2005 | Yoshida | 55/523 |
| 2005/0247038 A1 | 11/2005 | Takahashi | |
| 2005/0266992 A1 | 12/2005 | Ohno et al. | |
| 2006/0172113 A1 | 8/2006 | Kunieda | |
| 2006/0177629 A1 | 8/2006 | Kunieda | |
| 2006/0263574 A1 | 11/2006 | Tsunekawa et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292340 A1 | 12/2006 | Ohno et al. | |
| 2006/0292341 A1 | 12/2006 | Ohno et al. | |
| 2006/0292342 A1 | 12/2006 | Ohno et al. | |
| 2006/0292393 A1 | 12/2006 | Kunieda | |
| 2007/0004592 A1 | 1/2007 | Ohno et al. | |
| 2007/0004593 A1 | 1/2007 | Ohno et al. | |
| 2007/0039295 A1 | 2/2007 | Ohno | |
| 2007/0077190 A1 | 4/2007 | Ohno | |
| 2008/0118682 A1 | 5/2008 | Ido et al. | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |

FOREIGN PATENT DOCUMENTS

| | | | |
|---|---|---|---|
| EP | 0 283 224 A1 | | 9/1988 |
| EP | 0 449 556 A2 | | 10/1991 |
| EP | 1 142 619 A1 | | 10/2001 |
| EP | 1 249 262 A1 | | 10/2002 |
| EP | 1 384 508 A1 | | 1/2004 |
| EP | 1 623 750 | | 2/2006 |
| EP | 1 674 147 A1 | | 6/2006 |
| JP | 2-40239 | | 2/1990 |
| JP | 02-207846 A | | 8/1990 |
| JP | 5-213681 | | 8/1993 |
| JP | 05-269388 A | | 10/1993 |
| JP | 08-028246 A | | 1/1996 |
| JP | 10-263416 | | 10/1998 |
| JP | 02-208263 | * | 8/1999 |
| JP | 2000-102709 A | | 4/2000 |
| JP | 2001-170426 A | | 6/2001 |
| JP | 2001-190916 A | | 7/2001 |
| JP | 2001-329836 | | 11/2001 |
| JP | 2002-070545 | | 3/2002 |
| JP | 2002-070545 | * | 8/2002 |
| JP | 2002-273130 A | | 9/2002 |
| JP | 2002-326034 A | | 11/2002 |
| JP | 2002320807 | * | 11/2002 |
| JP | 2003-260322 | | 9/2003 |
| JP | 2003-262118 | | 9/2003 |
| JP | 2004-051384 A | | 2/2004 |
| JP | 2005-125182 | | 5/2005 |
| WO | WO 2005/099865 | | 10/2005 |

OTHER PUBLICATIONS

Matsumoto trans.*
Tsuji trans.*
International Preliminary Report on Patentability (translation) 7 pgs. International Application No. PCT/JP2005/011647 dated Dec. 24, 2007.
U.S. Appl. No. 11/296,494, U.S. Publ. No. 2007-0004592, Ref. IB1056US, Finnegan Ref. No. 09971.0002.
U.S. Appl. No. 11/317,199, U.S. Publ. No. 2006-0177629, Ref. GH1723.
U.S. Appl. No. 11/320,958, U.S. Publ. No. 2006-0292332, Ref. IB05002.
U.S. Appl. No. 11/320,974, U.S. Publ. No. 2006-0292333, Ref. IB05003.
U.S. Appl. No. 11/321,880, U.S. Publ. No. 2006-0292334, Ref. IB05004.
U.S. Appl. No. 11/321,882, U.S. Publ. No. 2006-0292335, Ref. IB05005.
U.S. Appl. No. 11/342,636, U.S. Publ. No. 2006-0172113, Ref. IB05001.
U.S. Appl. No. 11/367,332, U.S. Publ. No. 2006-0292337, Ref. IB05007.
U.S. Appl. No. 11/368,446, U.S. Publ. No. 2006-0292338, Ref. IB05006.
U.S. Appl. No. 11/370,933, U.S. Publ. No. 2006-0292339, Ref. IB05008.
U.S. Appl. No. 11/371,068, U.S. Publ. No. 2006-0292340, Ref. IB05009.
U.S. Appl. No. 11/414,361, U.S. Publ. No. 2007-0039295, Ref. FNIBA013WO.
U.S. Appl. No. 11/473,151, U.S. Publ. No. 2006-0292341, Ref. FNIBA018WO.
U.S. Appl. No. 11/475,967, U.S. Publ. No. 2007-0004593, Ref. FNIBA023WO.
K. Ohno, et al., "Honeycomb Structured Body", U.S. Appl. No. 11/298,833, filed Dec. 12, 2005.
K. Ohno, et al., "Honeycomb Structured Body", U.S. Appl. No. 11/298,510, filed Dec. 12, 2005.
K. Ohno, et al., "Honeycomb Structured Body, Manufacturing Device of Honeycomb Structured Body and Manufacturing Method of Honeycomb Structured Body", U.S. Appl. No. 11/320,689, filed Dec. 30, 2005.
K. Ohno, et al., "Honeycomb Structured Body and Method of Manufacturing the Same", U.S. Appl. No. 11/335,660, filed Jan. 20, 2006.
S. Ozaki, "Ceramic Honeycomb Structure" Patent Abstract of Japan of JP 2004-255377, published Sep. 16, 2004.
U.S. Appl. No. 11/853,658.
U.S. Appl. No. 11/928,546.
U.S. Appl. No. 12/194,888.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.
Derwent Abstract of XP-002375248.
Derwent Abstract of XP-002375249.

* cited by examiner

HONEYCOMB STRUCTURED BODY AND EXHAUST GAS CONVERTING APPARATUS

CROSS-REFERENCE TO RELATED APPLICATIONS

This application claims benefit of priority based on PCT/JP2005/011647 filed on Jun. 24, 2005. The contents of this application are incorporated herein by reference in their entirety.

BACKGROUND OF THE INVENTION

1. Field of the Invention

The present invention relates to a honeycomb structured body and an exhaust gas converting apparatus.

2. Discussion of the Background

Conventionally, honeycomb catalysts generally used for converting automobile exhaust gas are manufactured by supporting materials having high specific surface area such as activated alumina and catalyst metals such as platinum on the surface of a cordierite-based honeycomb structured body having an integral structure and low thermal expansive characteristics. Additionally, for the purpose of NOx treatment under excess oxygen atmosphere such as lean burn engine and diesel engine, alkaline earth metals such as Ba are supported as NOx-storage agents.

Meanwhile, in order to improve the converting performance, it is necessary to raise the contact probability between exhaust gas and the catalyst noble metals and NOx-storage agents. For that purpose, it is necessary to increase the specific surface area of the support and decrease the size of the noble metal particles and highly disperse them. Therefore, there are suggested honeycomb structured bodies in which the cell shape, cell density, wall thickness, and the like have been contrived (see, for example, JP-A 10-263416).

On the other hand, as the honeycomb structured body comprising high specific surface area materials, there have been known a honeycomb structured body obtainable by extrusion molding of inorganic fibers and inorganic binders (see, for example, JP-A 05-213681). Moreover, for the purpose of enlarging the size of such honeycomb structured body, there has been known one in which honeycomb units are bound one another through adhesive layers, and honeycomb units having the cross-sectional shape of 200 cm² or more have been indicated (see, for example, DE 4341159).

To deal with this problem, there has been disclosed a honeycomb structured body with the cross-sectional shape thereof changed from an exactly circular shape to a flat shape to adjust the circularity for improving the holding force of the honeycomb structured body (see, for example, JP-A 2003-262118). Further, there has also been disclosed a honeycomb structured body having irregularities formed on the periphery thereof so as to adjust the circularity (see, for example, JP-A 2001-329836).

Other than the above-mentioned-honeycomb structured bodies, there has been disclosed a honeycomb structured body, in which a bonding layer provided in the diagonal portion of cells is set thick so as to increase the isostatic strength (see, for example, JP-A 2003-260322).

The contents of JP-A 10-263416, JP-A 5-213681, DE 4341159, JP-A 2003-262118, JP-A 2001-329836, and JP-A 2003-260322 are incorporated herein by reference in their entirety.

SUMMARY OF THE INVENTION

The honeycomb structured body of the present invention is a honeycomb structured body comprising:

a pillar-shaped honeycomb block including a honeycomb unit in which a number of cells are longitudinally placed in parallel with a cell wall therebetween; and a sealing material provided on a peripheral portion of said pillar-shaped honeycomb block, wherein irregularities are formed on each peripheral face of said honeycomb structured body and said pillar-shaped honeycomb block, and said honeycomb unit comprises inorganic particles, as well as inorganic fibers and/or whiskers, when a least square curve is obtained by a least square method on the basis of points comprising the contour of a cross-section perpendicular to the longitudinal direction of said honeycomb structured body, a center-of-gravity of the least square curve is defined as $c_1$, a distance between a minimum concentric circumscribed curve having $c_1$ as the center-of-gravity, derived from said least square curve and the center-of-gravity $c_1$ is defined as $D_1$, a distance between a maximum concentric inscribed curve having $c_1$ as the center-of-gravity, derived from said least square curve and the center-of-gravity $c_1$ is defined as $D_2$, and $(D_1-D_2)$ is defined as $M_1$, the following inequality is satisfied: about 0.3 mm≦$M_1$; and when a least square curve is obtained by a least square method on the basis of points comprising the contour of a cross-section perpendicular to the longitudinal direction of said honeycomb block, a center-of-gravity of the least square curve is defined as $c_2$, a distance between a minimum concentric circumscribed curve having $c_2$ as the center-of-gravity, derived from said least square curve and the center-of-gravity $c_2$ is defined as $D_3$, a distance between a maximum concentric inscribed curve having $c_2$ as the center-of-gravity, derived from said least square curve and the center-of-gravity $c_2$ is defined as $D_4$, and $(D_3-D_4)$ is defined as $M_2$, the following inequality is satisfied: about 0.5 mm≦$M_2$≦about 7.0 mm.

In the present honeycomb structured body, said $M_1$ is about 3.0 mm or less.

Moreover, in the above honeycomb structured body, desirably, the center-of-gravity $c_1$ does not correspond to the center-of-gravity $c_2$, and a distance between the center-of-gravity $c_1$ and the center-of-gravity $c_2$ is at least about 0.1 mm and at most about 10.0 mm.

In the above honeycomb structured body, desirably, when the centers-of-gravities $c_2$ of the least square curves are obtained at three points or more along the longitudinal direction of said honeycomb block, at least one of the centers-of-gravities $c_2$ are not present in the same straight line parallel to the longitudinal direction of said honeycomb block, and when the centers-of-gravities $c_1$ of the least square curves are obtained at three points or more along the longitudinal direction of said honeycomb structured body, at least one of the centers-of-gravities $c_1$ are not present in the same straight line parallel to the longitudinal direction of said honeycomb structured body.

In the above honeycomb structured body, desirably, at the time when a least square method is applied for the centers-of-gravities $c_2$ of at least three points or more, the obtained straight line is defined as a least square straight line, and when the distance between the least square straight line and the respective centers-of-gravities $c_2$ is defined as r, while the distance between the respective centers-of-gravities $c_2$ and the outermost point of the least square curve with $c_2$ as a center-of-gravity is defined as D, a ratio of r to D (r/D) is at least about 0.1% and at most about 3%.

In the above honeycomb structured body, said honeycomb block is desirably configured by binding a plurality of the honeycomb units together. The plurality of honeycomb units desirably comprise honeycomb units in which a peripheral processing is carried out to provide a plurality of honeycomb units having different cross-sectional shapes, and honeycomb units in which an extrusion molding is carried out to provide a plurality of honeycomb units having different cross-sectional shapes.

In this case, the area of the cross-section perpendicular to the longitudinal direction of said honeycomb unit is at least about 5 $cm^2$ and at most about 50 $cm^2$. Moreover, the total of the areas of the cross-sections perpendicular to the longitudinal direction of said honeycomb unit accounts for about 85% or more of the area of the cross-section perpendicular to the longitudinal direction of said honeycomb structured body.

In the above honeycomb structured body, said inorganic particles comprises desirably at least one kind selected from the group consisting of alumina, silica, zirconia, titania, ceria, mullite and zeolite. The amount of the inorganic particles contained in the honeycomb unit is desirably at least about 30% and at most about 97% by weight.

In the above honeycomb structured body, said inorganic fibers and/or whiskers comprises desirably at least one kind selected from the group consisting of alumina, silica, silicon carbide, silica alumina, glass, potassium titanate and aluminum borate. The total amount of the inorganic fibers and/or whiskers contained in the honeycomb unit is desirably at least about 3% and at most about 70% by weight.

In the above honeycomb structured body, it is desirable that the honeycomb unit further contains an inorganic binder. The inorganic binder comprises desirably at least one kind selected from the group consisting of alumina sol, silica sol, titania sol, water glass, sepiolite and attapulgite.

In the above honeycomb structured body, a catalyst is desirably supported thereon, and said catalyst desirably comprises at least one kind selected from the group consisting of a noble metal, alkali metal, alkaline earth metal and oxide.

An exhaust gas converting apparatus according to the present invention comprises the honeycomb structured body of the present invention that is installed in a casing connected to an exhaust passage of an internal combustion engine through a mat-like holding sealing material.

In the exhaust gas converting apparatus, desirably, the mat-like holding sealing material comprises a non-expansive ceramic fiber mat. It is desirable that the mat-like holding sealing material further comprises alumina and/or silica.

DESCRIPTION OF THE EMBODIMENTS

Figure 1:
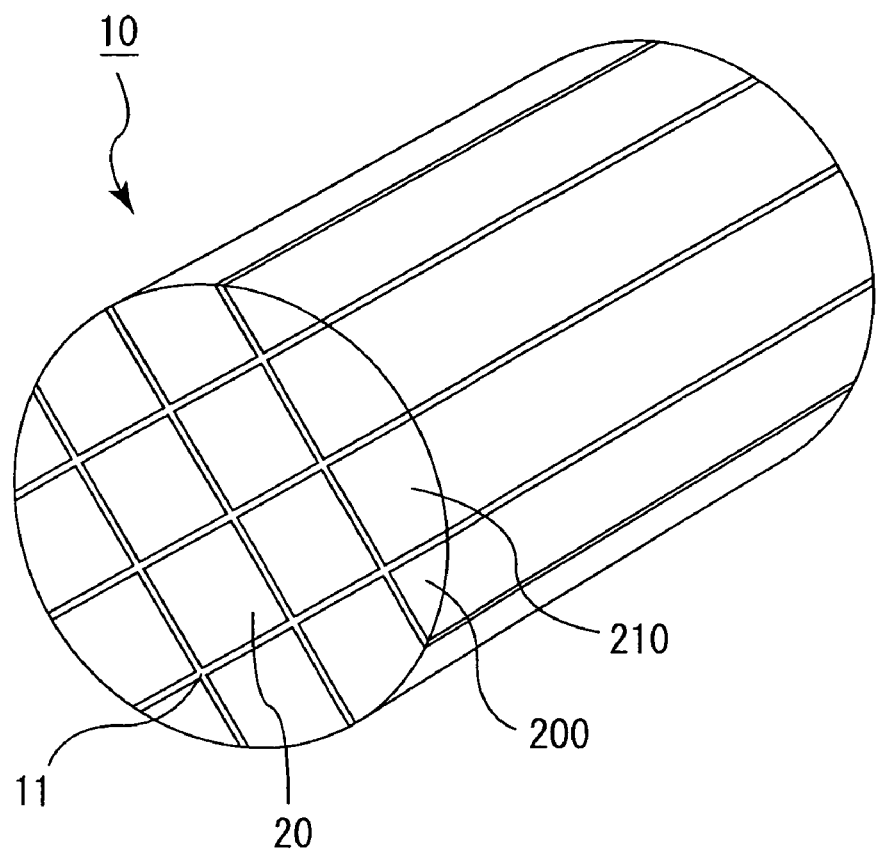
FIG. 1 is a perspective view that schematically shows one example of a honeycomb structured body of the present invention.

Hereinafter, the honeycomb structured body and the exhaust gas purifying (converting) apparatus of the present invention will be described with reference to the drawings.

First, the honeycomb structured body of the present invention will be described.

The honeycomb structured body of the present invention is a honeycomb structured body comprising:

a pillar-shaped honeycomb block including a honeycomb unit in which a number of cells are longitudinally placed in parallel with a cell wall therebetween; and a sealing material provided on a peripheral portion of said pillar-shaped honeycomb block, wherein irregularities are formed on each peripheral face of said honeycomb structured body and said pillar-shaped honeycomb block, and said honeycomb unit comprises inorganic particles, as well as inorganic fibers and/or whiskers, when a least square curve is obtained by a least square method on the basis of points comprising the contour of a cross-section perpendicular to the longitudinal direction of said honeycomb structured body, a center-of-gravity of the least square curve is defined as $c_1$, a distance between a minimum concentric circumscribed curve having $c_1$ as the center-of-gravity, derived from said least square curve and the center-of-gravity $c_1$ is defined as $D_1$, a distance between a maximum concentric inscribed curve having $c_1$ as the center-of-gravity, derived from said least square curve and the center-of-gravity $c_1$ is defined as $D_2$, and ($D_1-D_2$) is defined as $M_1$, the following inequality is satisfied: about 0.3 mm≦$M_1$; and when a least square curve is obtained by a least square method on the basis of points comprising the contour of a cross-section perpendicular to the longitudinal direction of said honeycomb block, a center-of-gravity of the least square curve is defined as $c_2$, a distance between a minimum concentric circumscribed curve having $c_2$ as the center-of-gravity, derived from said least square curve and the center-of-gravity $c_2$ is defined as $D_3$, a distance between a maximum concentric inscribed curve having $c_2$ as the center-of-gravity, derived from said least square curve and the center-of-gravity $c_2$ is defined as $D_4$, and ($D_3-D_4$) is defined as $M_2$, the following inequality is satisfied: about 0.5 mm≦$M_2$≦about 7.0 mm.

The honeycomb structured body of the present invention has high strength (high durability) against thermal shock, and is less likely to generate cracks and damage and has excellent durability even in the case where a high pressure is applied to a peripheral face thereof.

Additionally, since the honeycomb unit comprises inorganic particles as well as inorganic fibers and/or whiskers, the specific surface area is increased by the inorganic particles, and also the strength of the honeycomb unit is improved by the inorganic fibers and/or whiskers; thus, the honeycomb structured body of the present invention can be preferably used as a catalyst converter.

Moreover, the honeycomb structured body in which the centers-of-gravities $c_1$ does not correspond to the center-of-gravity $c_2$ (hereinafter, referred to as a center-of-gravity divergent-type honeycomb structured body) has high push-out strength. Thus, even when it is installed in the casing through the mat-like holding sealing material to serve as an exhaust gas converting apparatus and used as a catalyst converter or a honeycomb filter (when subjected to thermal shock) for a long period of time, the honeycomb structured body remains firmly installed without rattling, having excellent durability.

Furthermore, the honeycomb structured body, in which when the centers-of-gravities $c_2$ of the least square curves are obtained at three points or more along the longitudinal direction of the honeycomb block, at least one of the centers-of-gravities $c_2$ are not present in the same straight line parallel to the longitudinal direction of the honeycomb block, or the honeycomb structured body, in which when the centers-of-gravities $c_1$ of the least square curves are obtained at three points or more along the longitudinal direction of the honeycomb structured body, at least one of the centers-of-gravities $c_1$ are not present in the same straight line parallel to the longitudinal direction of the honeycomb structured body (hereinafter, referred to as a minute curved-type honeycomb structured body) has excellent push-out strength and durability.

The exhaust gas converting apparatus of the present invention is manufactured using the honeycomb structured body of the present invention, and thus is provided with the effects of the honeycomb structured body of the present invention, also has excellent strength against thermal shock, with which the honeycomb structured body remains firmly installed even in use for a long period of time.

Although the honeycomb structured body of the present invention is configured by comprising a pillar-shaped honeycomb block including a honeycomb unit in which a number of cells are placed in parallel in the longitudinal direction with a cell wall therebetween, the honeycomb block may be configured by binding pillar-shaped honeycomb units in which a plurality of cells are placed in parallel in the longitudinal direction with a cell wall therebetween, through a sealing material layer (adhesive layer) (hereinafter, the honeycomb structured body (block) including the honeycomb block with the above-mentioned structure is also referred to as an assembly-type honeycomb structured body (block)), or the honeycomb block may be configured with a ceramic member integrally formed by sintering (hereinafter, a honeycomb structured body (block) including a honeycomb block with the above-mentioned structure is also referred to as an integral-type honeycomb structured body (block)).

In the honeycomb structured body of the present invention, when the honeycomb block is the above-mentioned assembly-type honeycomb block, the cell wall is composed of the cell wall that separate cells in the honeycomb units, the outer walls of the honeycomb units, and the sealing material layer (which preferably function also as a adhesive) interposed between the honeycomb units, whereas when the honeycomb block is the above-mentioned integral-type honeycomb block, the cell wall is composed of only one kind of cell wall.

Figure 2A:
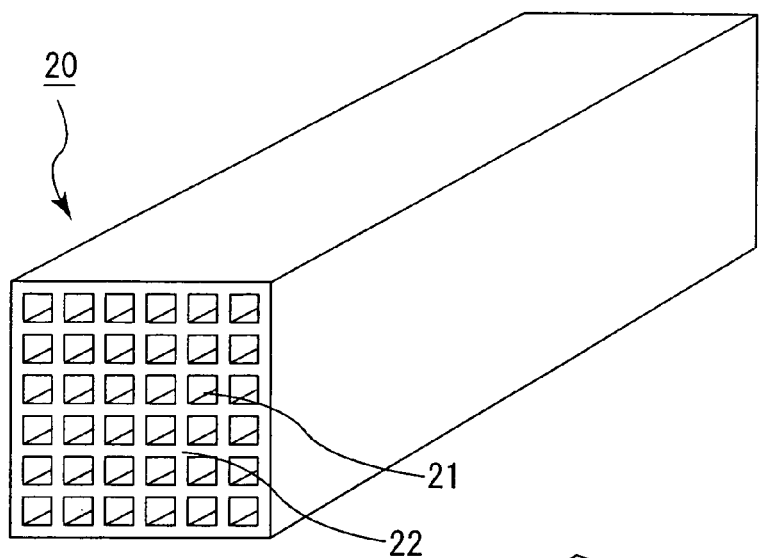
FIGS. 2A to 2C are perspective views that schematically show one example of honeycomb units comprising the honeycomb structured body of the present invention.
Figure 2B:
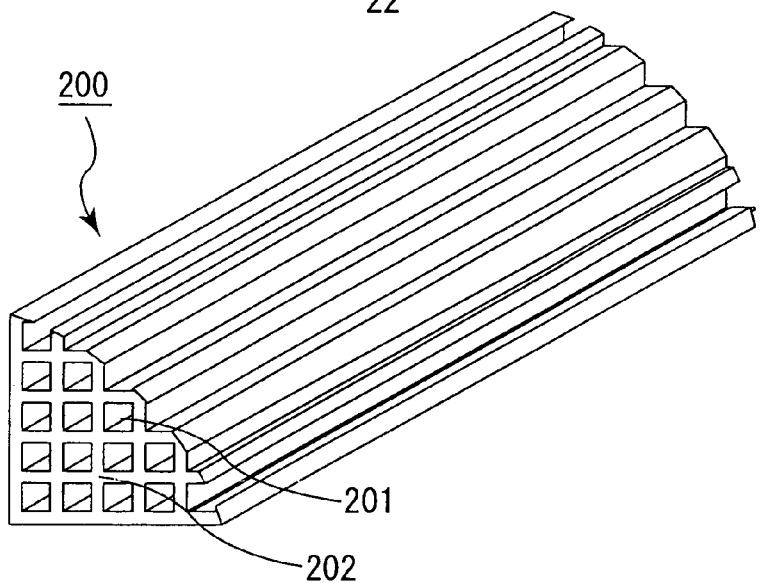
Figure 2C:
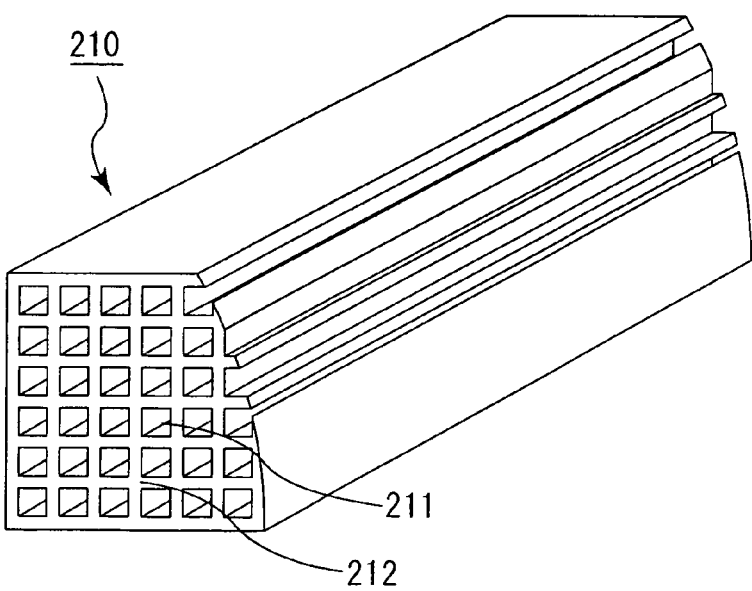

FIG. 1 is a perspective view that schematically shows one example of an assembly-type honeycomb block to be used in the honeycomb structured body of the present invention. FIGS. 2A to 2C are perspective views that schematically show one example of honeycomb units comprising the honeycomb block shown in FIG. 1.

As shown in FIG. 1, in a honeycomb structured body 10 of the present invention, a plurality of honeycomb units 20, 200 and 210 comprising porous ceramic, each having a different shape, are bound to one another through a sealing material layer 11 to configure a substantially cylindrical honeycomb block. Although not shown in FIG. 1, irregularities are formed on the peripheral face of the honeycomb block.

As shown in FIG. 2A, the honeycomb unit 20 comprising the honeycomb structured body 10 is a rectangular pillar-shaped body having a substantially square cross-section and comprising a number of cells 21 that are placed in parallel in the longitudinal direction with a cell wall 22 therebetween.

Further, as shown in FIG. 2B, the honeycomb unit 200 is a pillar-shaped body with the periphery thereof partially cut off, has a substantially sectorial cross-section and comprises a number of cells 201, that are placed in parallel in the longitudinal direction with a cell wall 202 therebetween, and a part of the cells 201 is exposed at the cut-off portion of the periphery. Namely, groove-shaped irregularities are formed by the exposed cells 201 on a part of the peripheral face of the honeycomb unit 200.

Further, as shown in FIG. 2C, the honeycomb unit 210 is a pillar-shaped body with the vicinity of one corner of the periphery thereof cut off, comprises a number of cells 211 that are placed in parallel in the longitudinal direction with a cell wall 212 therebetween, and a part of the cells 211 is exposed at the cut-off portion of the periphery. Namely, groove-shaped irregularities are formed by the exposed cells 211 on a part of the peripheral face of the honeycomb unit 210.

The honeycomb block 10 in the honeycomb structured body is configured by combining, through the sealing material layer 11, the honeycomb units 20, 200 and 210 having the above-mentioned structures, in such a manner that the rectangular pillar-shaped honeycomb unit 20 having no irregularities formed on the peripheral face thereof are positioned in the vicinity of the center of the honeycomb block, and the honeycomb unit 200 and the honeycomb unit 210, both having irregularities formed on the peripheral faces thereof, are positioned in the vicinity of the periphery of the honeycomb block.

That is to say, in the honeycomb structured body 10, the groove-shaped irregularities on the peripheral face of the honeycomb block are formed by partially removing the cells that comprise the honeycomb unit 200 and the honeycomb unit 210 to expose the remaining portion at the peripheral face.

Figure 3:
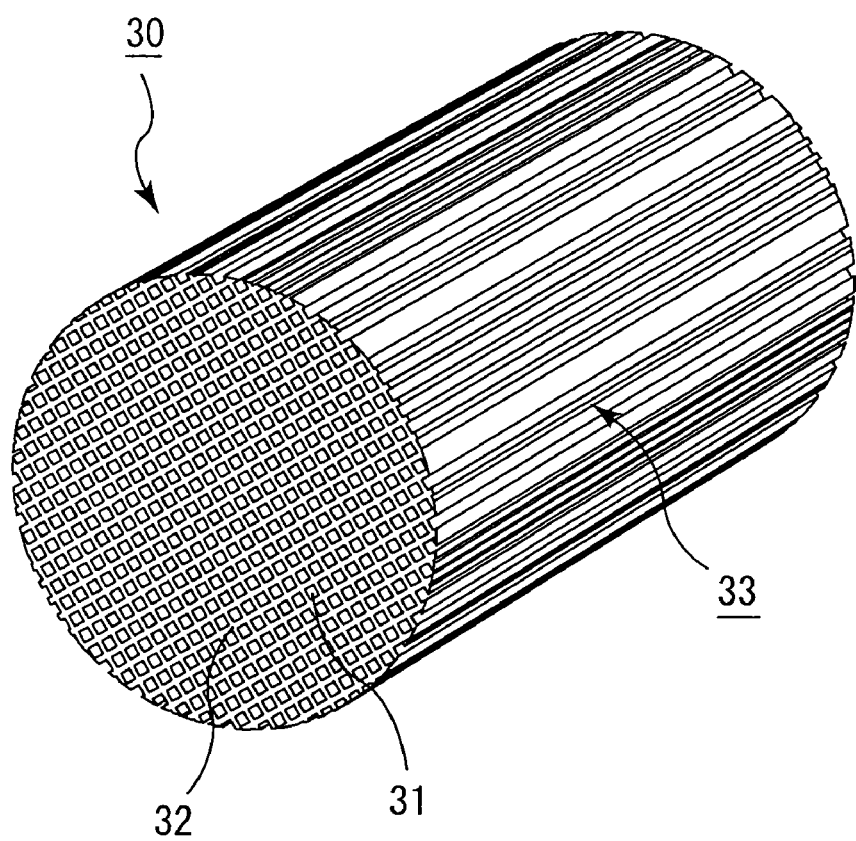
FIG. 3 is a perspective view that schematically shows another example of the honeycomb structured body of the present invention.

FIG. 3 is a perspective view that schematically shows one example of the integral-type honeycomb block for use in the honeycomb structured body of the present invention.

This honeycomb block comprises a substantially cylindrical honeycomb block made of the honeycomb unit in which a number of cells 31 are placed in parallel in the longitudinal direction with a cell wall 32 therebetween, and irregularities 33 are formed on the peripheral face of the honeycomb block.

In a honeycomb structured body 30 having such a structure, as in the case of the honeycomb structured body 10 shown in FIG. 1 and FIGS. 2A and 2B, the irregularities 33 on the peripheral face of the honeycomb block are formed by partially removing the cells 31 comprising the honeycomb block to expose the remaining portion at the peripheral face.

As described above, in the honeycomb structured body of the present invention, irregularities are formed on the peripheral face of the honeycomb block whether in the case of the assembly-type honeycomb structured body or the integral-type honeycomb structured body.

Studies conducted by the present inventor have revealed the following: a conventional honeycomb structured body is provided with a sealing material layer to make the entire periphery thereof uniform and make the side face of the cylinder flat by elimination of groove-shaped irregularities; however, in the case where a honeycomb structured body with irregularities (moreover, groove-shaped irregularities at all the cross-sections in the longitudinal direction) left on the peripheral face thereof is subjected to a thermal shock test and the like, the state of the irregularities that are formed on the honeycomb block becomes ill-balanced, and resistance of the honeycomb structured body to thermal shock deteriorates. The reason for this is not clear, but is presumably as follows.

In the honeycomb structured body, heat is released uniformly from the center toward the periphery, but with irregularities formed on the surface of the honeycomb structured body, the surface area increases to cause cooling effect, which is apt to induce rapid thermal shock. Further, in microscopic view, the top of the protrusion is considered as susceptible to thermal shock as compared with the bottom of the recess.

It is also considered that, at this time, the honeycomb unit and the sealing material layer (coating layer) do not exhibit exactly the same physical properties due to difference in material, density and the like between those two members, and hence thermal stress is also caused herein.

It is therefore thought that changing the states of the irregularities that are formed on the above two places may alleviate strain of the insides thereof caused by thermal stress.

In the following, the irregularities that are formed on the peripheral faces of the honeycomb structured body of the present invention and the honeycomb block will be described.

It is to be noted that, as for measurement of the degree of irregularities at the peripheral face of the honeycomb structured body, since it can be performed in the same manner as the measurement before formation of the sealing material layer (coating layer) on the honeycomb block, the following description is restricted to the measurement of the honeycomb block. Although the honeycomb block can be measured during the process for manufacturing the honeycomb structured body, if measured after the manufacturing, the sealing material layer (coating layer) may be removed by processing, polishing and the like, and thereafter, same measurement may be conducted at the honeycomb block portion.

In the honeycomb block for use in the honeycomb structured body of the present invention, in order to obtain the size of the irregularities that are formed on the peripheral face of the honeycomb block, first, positional data concerning points on the contour of a cross-section perpendicular to the longitudinal direction of the honeycomb block (hereinafter, also simply referred to as a cross-section of the honeycomb block) are plotted on a two dimensional coordinate; said positional data can be obtained by measurement of 10 points or more on the contour.

Figure 4A:
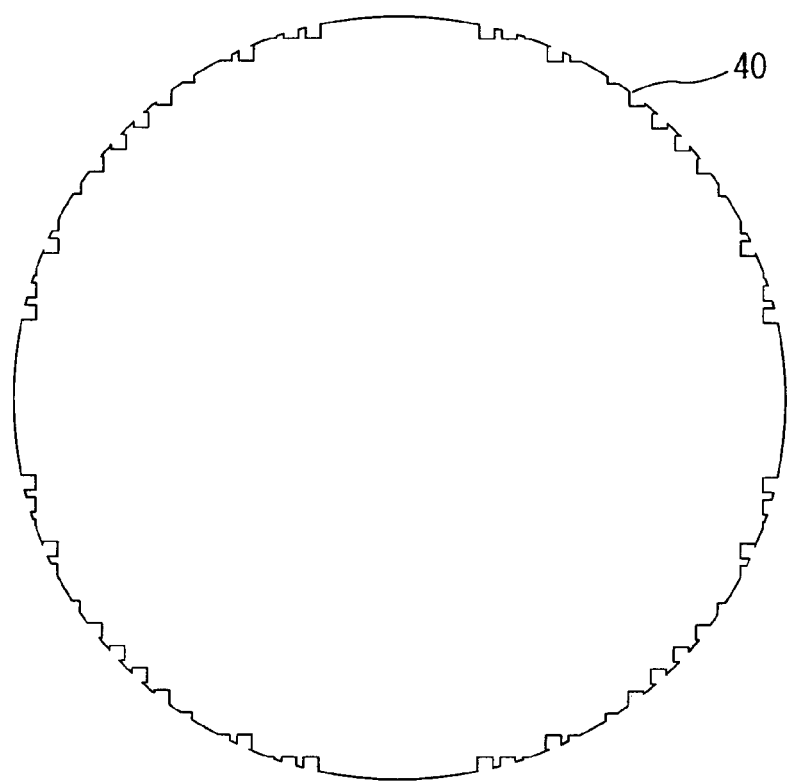
FIG. 4A is a view that shows one example of a curve drawn by plotting positional data concerning points on the contour of a cross-section of a honeycomb block on a two dimensional coordinate.

FIG. 4A is a view that shows one example of a curve drawn by plotting positional data concerning points on the contour of a cross-section of the above-mentioned honeycomb block on a two dimensional coordinate.

As shown in FIG. 4A, when the measured positional data concerning points on the contour are plotted on the two dimensional coordinate, a curve 40 is drawn which has a bent portion in the substantially same shape as the above cross-section of the honeycomb block.

It should be noted that the curve 40 shown in FIG. 4A is drawn by plotting the positional data concerning points on the contour of the cross-section of the honeycomb block in the honeycomb structured body 10 shown in FIG. 1 on the two dimensional coordinate, and in FIG. 4($a$), the two dimensional coordinate is omitted.

In the honeycomb structured body of the present invention, 10 or more positional data concerning points on the contour are measured. If the number of the positional data to be measured is 10 or more, the shape of the curve to be drawn on the two dimensional coordinate becomes considerably different from the cross-sectional shape of the honeycomb block, making it difficult to accurately determine variations of the irregularities that are formed on the peripheral face of the honeycomb block.

Although the number of the positional data to be measured is not particularly limited as long as the number is 10 or more, it is desirable to measure 100 or more. This is because, with 100 or more positional data, the shape of the curve drawn on the two dimensional coordinate is approximate to the actual cross-sectional shape of the honeycomb block.

Further, it is desirable that the points to be measured are equally spaced on the contour. This is because, with the points equally spaced, variations of the irregularities on the peripheral face of the honeycomb block can be measured more accurately.

When positional data concerning points on the contour are plotted on the two dimensional coordinate, a commercially available three dimensional measurement apparatus can be employed.

The three dimensional measurement apparatus is not particularly limited, and examples may include "LEGEX Series", "FALCIO-APEX Series", "Bright-Apex Series", "MACH Series", "CHN Series, and "BH-V Series", which are manufactured by Mitsutoyo Corp.

Next, a least square curve is drawn on the two dimensional coordinate by the least square method using the positional data concerning points on the contour, to obtain the center-of-gravity $c2$ of the least square curve.

Subsequently, the minimum concentric circumscribed curve having $c2$ as the center-of-gravity, derived from the least square curve, and the maximum concentric inscribed curve having $c2$ as the center-of-gravity, derived from the least square curve are determined.

The minimum concentric circumscribed curve and the maximum concentric inscribed curve are not limited to circles, and may be ellipses or curves of other shapes. Further, the minimum concentric circumscribed curve and the maximum concentric inscribed curve are similar figures sharing the center-of-gravity $c2$.

If those curves are circles, it is advisable to conform to the method for obtaining circularity in JIS B 0621.

The contents of JIS B 0621 are incorporated herein by reference in its entirety.

Figure 4B:
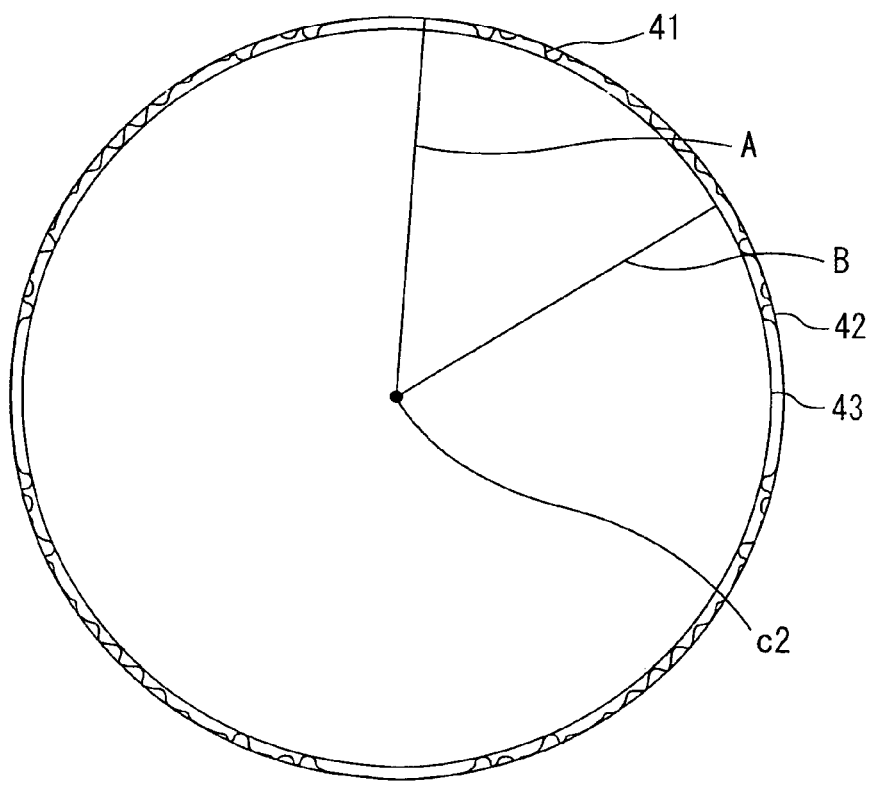
FIG. 4B is a view that shows one example of a least square curve obtained by a least square method using the positional data shown in FIG. 4A, and two circles for creating a minimum region to be used when circularity of the least square curve is obtained based on JIS B 0621.

FIG. 4B is a view that shows each example of a least square curve, drawn by the least square method using the positional data shown in FIG. 4A, the minimum concentric circumscribed curve, the maximum concentric inscribed curve and the center-of-gravity $c2$, and in FIG. 4B, the two dimensional coordinate is omitted.

As shown in FIG. 4B, the irregularities of the least square curve 41 are more smoother than those of the curve 40 shown in FIG. 4A, and is composed between the minimum concentric circumscribed curve 42 and the maximum concentric inscribed curve 43, the minimum concentric circumscribed curve 42 being more spread from the center-of-gravity $c2$ than the maximum concentric inscribed curve 43.

Herein, the minimum concentric circumscribed curve 42 and the maximum concentric inscribed curve 43 are concentric to one another, sharing the center-of-gravity $c2$, as described above; specifically, at least one part of the protrusions of the least square curve 41 are present on the minimum concentric circumscribed curve 42 and the other portion of the least square curve 41 is present inside the minimum concentric circumscribed curve 42, and the minimum concentric circumscribed curve 42 is a curve at the shortest distance away from the center-of-gravity $c2$, while at least one part of the recesses of the least square curve 41 are present on the maximum concentric inscribed curve 43 and the other portion of the least square curve 41 is present outside the maximum concentric inscribed curve 43, and the maximum concentric inscribed curve 43 is a curve at the longest distance away from the center-of-gravity $c2$.

In the present invention, the distance D3 between the center-of-gravity $c2$ and the minimum concentric circumscribed curve of the least square curve (refer to A in FIG. 4), and the distance D4 between the center-of-gravity $c2$ and the maximum concentric inscribed curve of the least square curve (refer to B in FIG. 4) are measured, followed by calculating as follows: (D3−D4)=M2.

In the honeycomb block of the honeycomb structured body of the present invention, M2 is allowed to represent the size of the irregularities that are formed on the outer face of the honeycomb block.

Figure 10A:
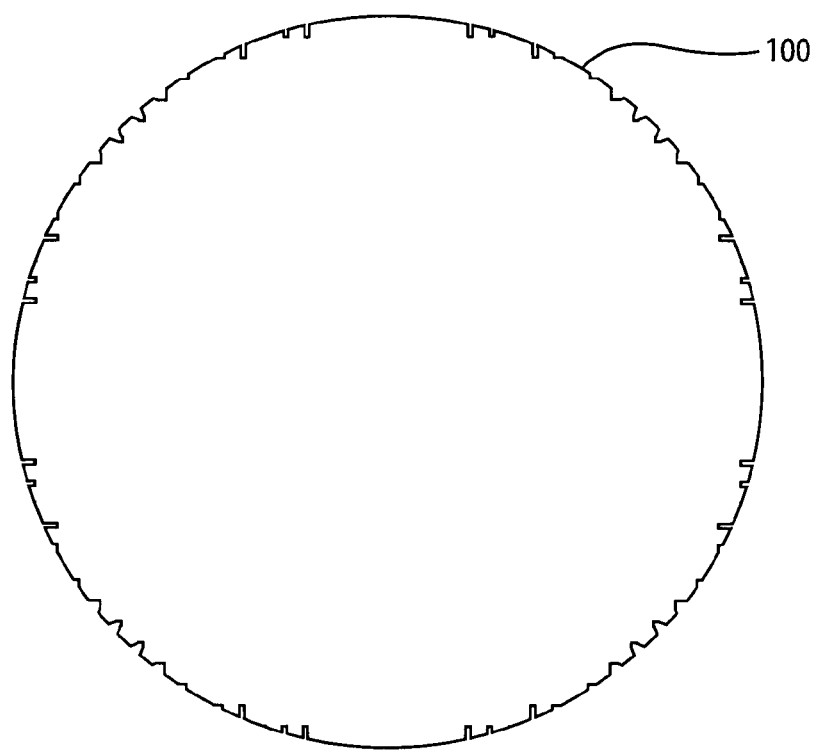
Figure 10B:
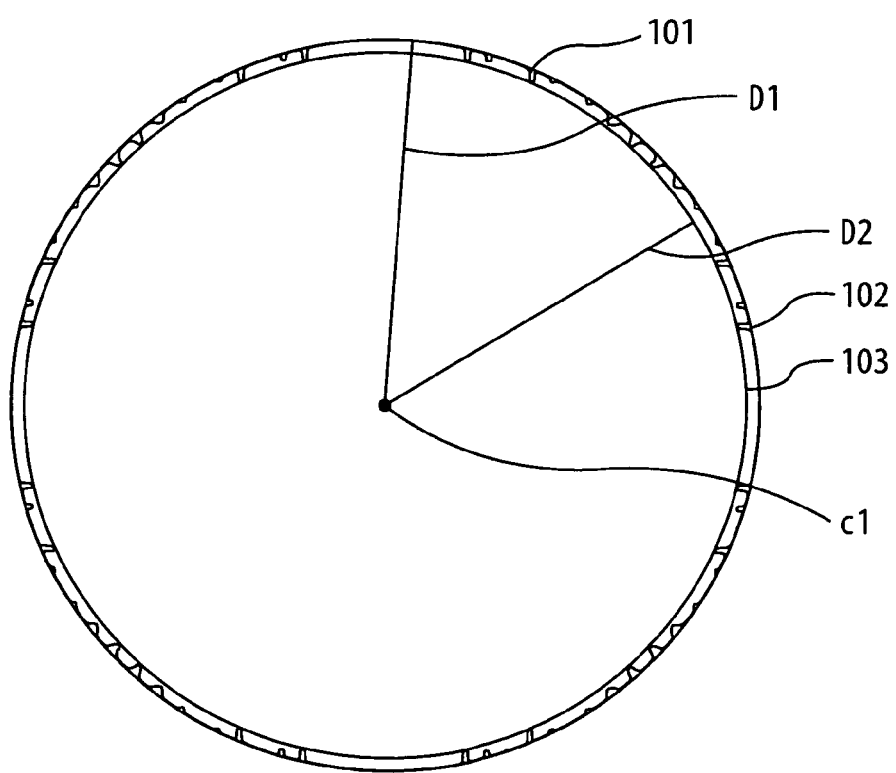

Further, in the honeycomb structured body of the present invention, in the same manner as in the case of the honeycomb block, a least square curve 101 is obtained by the least square method based on points 100 comprising the contour of a cross-section perpendicular to the longitudinal direction of the honeycomb structured body (see FIG. 10A), and the center-of-gravity of the obtained least square curve 102 is defined as $c1$ (see FIG. 10B). Subsequently, the minimum concentric circumscribed curve having $c1$ as the center-of-gravity, derived from the least square curve, is obtained and a distance between the center-of-gravity $c1$ and the minimum concentric circumscribed curve is defined as a distance D1, as shown in FIG. 10B. Further, the maximum concentric inscribed curve 103 having $c1$ as the center-of-gravity, derived from the least square curve, is obtained and a distance between the center-of-gravity $c1$ and the maximum concentric inscribed curve is defined as a distance D2 (see FIG. 10B), followed by calculating as follows: (D1−D2)=M1.

In the honeycomb structured body of the present invention, M1 is about 0.3 mm or more.

When M1 is less than 0.3 mm, almost no irregularities are formed on the peripheral face of the honeycomb block, and thereby the problem of thermal stress, as described above, might occur in the honeycomb structured body.

M1 is desirably about 3.0 mm or less. When M1 exceeds about 3.0 mm, large irregularities are formed on the peripheral face of the honeycomb structured body, and in such a honeycomb structured body, as described above, thermal stress is apt to cause crack or chipping in the protrusions of the peripheral face of the honeycomb block.

Moreover, in the honeycomb block for use in the honeycomb structured body of the present invention, the following inequality is satisfied: about 0.5 mm≦M2≦about 7.0 mm.

It is considered that, when M2 is less than about 0.5 mm, almost no irregularities are formed on the peripheral face of the honeycomb block and thermal stress is generated between the honeycomb block and the sealing material layer (coating layer), hence cracks are generated.

On the other hand, it is considered that, when M2 exceeds about 7.0 mm, large irregularities are formed on the peripheral face of the honeycomb block, and in such a honeycomb structured body, thermal stress is generated between the honeycomb block and the sealing material layer (coating layer), thus cracks are generated.

As described above, irregularities having a predetermined size are formed on the peripheral face of the honeycomb block in the honeycomb structured body of the present invention. While the irregularities formed on the peripheral face of the honeycomb block may be formed by partially removing the cells comprising the honeycomb block, and then exposing the remaining portion at the peripheral face as in the honeycomb structured bodies shown in FIGS. 1 to 3, for example, step-like irregularities may be formed on the peripheral face of the honeycomb block, as a honeycomb structured body 50 and a honeycomb structured body 500 shown in FIGS. 5A and 5B.

Figure 5A:
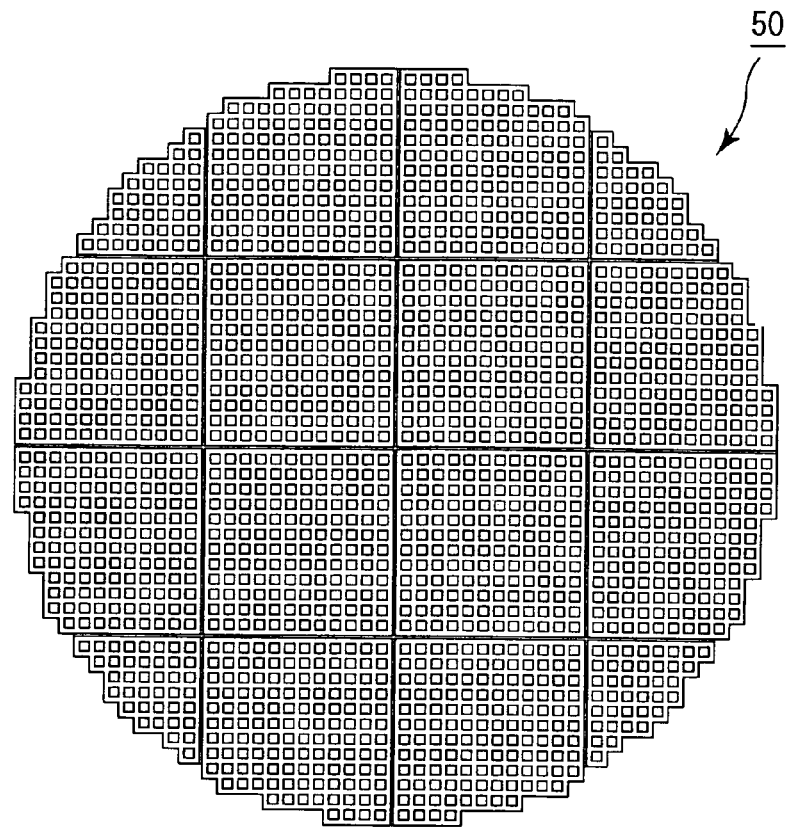
FIG. 5A is a front view that schematically shows another example of an assembly-type honeycomb structured body as the honeycomb structured body of the present invention.
Figure 5B:
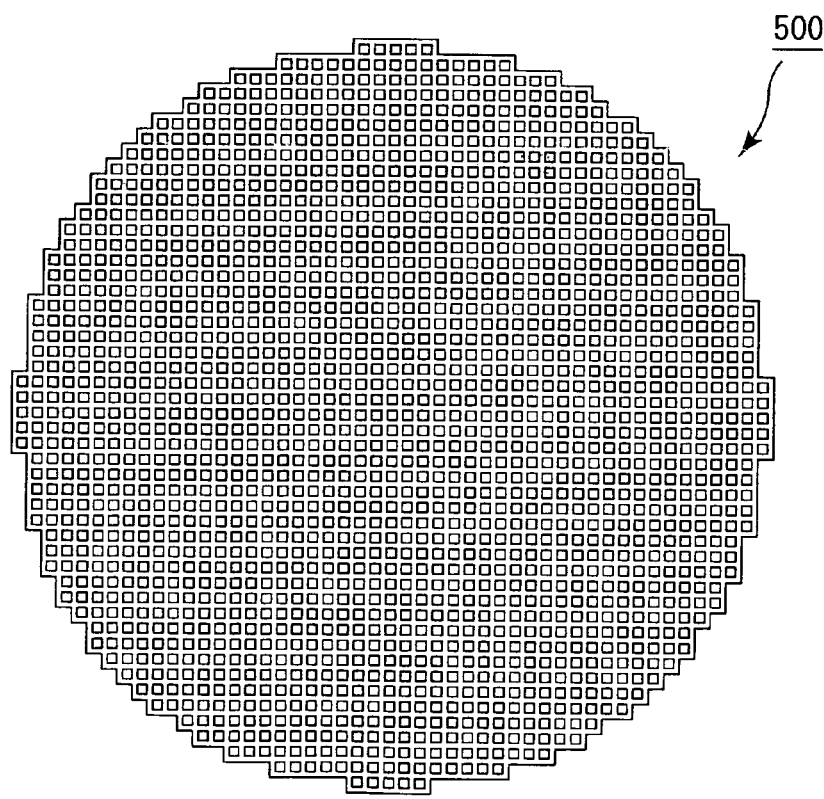
FIG. 5B is a front view that schematically shows another example of an integral-type honeycomb structured body as the honeycomb structured body of the present invention.

It is to be noted that FIG. 5A is a front view that schematically shows another example of the assembly-type honeycomb block 50, and FIG. 5B is a front view that schematically shows another example of the integral-type honeycomb block 500.

In the honeycomb block 50 and the honeycomb block 500 which are shown in FIGS. 5A and 5B, a cross-sectional shape of every cell, including cells that are formed in the vicinity of the peripheral face of the honeycomb block, is a substantially square, and the irregularities formed on the peripheral face of the honeycomb block are formed stepwise along the cross-sectional shape of the cells in the vicinity of the peripheral face of the honeycomb block.

The honeycomb blocks 50 and 500 as described above have the substantially same structure as that of the honeycomb structured body 10 shown in FIG. 1 as well as that of the honeycomb structured body 30 shown in FIG. 3, except that the shape of the irregularities formed on the respective peripheral faces of the honeycomb block is different.

The honeycomb unit comprising the honeycomb structured body of the present invention comprises inorganic particles, as well as inorganic fibers and/or whiskers.

The inorganic particles include desirably particles comprising at least one kind selected from the group consisting of alumina, silica, zirconia, titania, ceria, mullite, and zeolite. These may be used alone or two or more of them may be used in combination. Among these, particles comprising alumina are particularly preferred.

As the inorganic fibers or whiskers, inorganic fibers or whiskers comprising at least one kind selected from the group consisting of alumina, silica, silicon carbide, silica alumina, glass, potassium titanate, and aluminum borate are preferred. These may be used alone or two or more of them may be used in combination.

As the aspect ratio (length/path) of the inorganic fibers or whiskers, the lower limit is desirably about 2, more desirably about 5, still more desirably about 10. On the other hand, the upper limit is desirably about 1000, more desirably about 800, still more desirably about 500.

As the content of the inorganic particles included in the honeycomb unit, the lower limit is desirably about 30% by weight, more desirably about 40% by weight, still more desirably about 50% by weight.

On the other hand, the upper limit is desirably about 97% by weight, more desirably about 90% by weight, still more desirably about 80% by weight, particularly desirably about 75% by weight.

When the content of the inorganic particles is in the range of about 30% by weight to about 97% by weight, the amount of inorganic particles that devote to improvements of the specific surface area becomes relatively large, making the specific surface area of the honeycomb structured body to become large, enabling a catalyst component to disperse in a high level upon supporting the catalyst component. Moreover, a sufficient amount of inorganic fibers and/or whiskers which contribute to strength improvement is provided, and thus the strength of the honeycomb structured body is enhanced.

As the total amount of the inorganic fibers and/or whiskers contained in the honeycomb unit, the lower limit is desirably about 3% by weight, more desirably about 5% by weight, still more desirably about 8% by weight. On the other hand, the upper limit is desirably about 70% by weight, more desirably about 50% by weight, still more desirably about 40% by weight, particularly desirably about 30% by weight.

When the total amount of the inorganic fibers and/or whiskers is at least about 3% and at most about 70% by weight, the strength of the honeycomb structured body can be maintained, and the amount of inorganic particles that devote to improvements of the specific surface area can be made relatively large, making the specific surface area of the honeycomb structured body large, enabling a catalyst component to disperse in a high level upon supporting the catalyst component.

Moreover, the honeycomb unit is desirably manufactured using a mixture comprising the above-mentioned inorganic particles as well as inorganic fibers and/or whiskers, and further an inorganic binder.

By using such mixture comprising an inorganic binder, even when the temperature at which a raw molded body is sintered is lowered, a honeycomb unit with sufficient strength can be obtained.

As the inorganic binder, there may be used inorganic sols, clay binders, and the like. As specific examples of the inorganic sols, there may be mentioned, for example, alumina sol, silica sol, titania sol, water glass, and the like. As the clay binders, there may be mentioned, for example, multiple chain structure type clays such as white clay, kaolin, montmorillonite, sepiolite and attapulgite. Among these, at lease one kind selected from the group consisting of alumina sol, silica sol, titania sol, water glass, sepiolite and attapulgite is desirably used.

with respect to the amount of the inorganic binder, as the solid content of a material paste prepared in the after-mentioned manufacturing process, the lower limit thereof is desirably about 5% by weight, more desirably about 10% by weight, still more desirably about 15% by weight. On the other hand, the upper limit is desirably about 50% by weight, more desirably about 40% by weight, still more desirably about 35% by weight.

When the content of the inorganic binder is about 50% by weight or less, sufficient moldability can be obtained.

In the case where the honeycomb structured body of the present invention is the assembly-type honeycomb structured body shown in FIG. 1, a plurality of honeycomb units are bound to one another through the sealing material layer which functions as an adhesive, the material comprising the sealing material layer (adhesive layer) is not particularly limited, and examples of the material may include materials made of an inorganic binder, as well as an inorganic fiber and/or an inorganic particle. If necessary, it is also possible to use material incorporated with an organic binder.

As described above, the material comprising the sealing material layer (coating layer) on the peripheral face of the honeycomb block of the honeycomb structured body of the present invention may be the same as, or different from, the material for the above-mentioned sealing material layer (adhesive layer). Further, when the material for the sealing material layer (coating layer) is the same as that for the sealing material layer (adhesive layer), the respective blending ratios of those materials may be the same or different.

Examples of the inorganic binder may include silica sol, alumina sol and the like. Each of these may be used alone or two or more kinds of these may be used in combination. Among the above-mentioned inorganic binders, silica sol is desirably used.

Examples of the organic binder may include polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is desirably used.

Examples of the inorganic fiber may include ceramic fibers such as silica-alumina, mullite, alumina, silica and the like. Each of these may be used alone or two or more kinds of these may be used in combination. Among the above-mentioned inorganic fibers, alumina fiber and silica-alumina fiber are desirably used. The lower limit value of the fiber length of the inorganic fiber is desirably about 5 μm. The upper limit value of the fiber length of the inorganic fiber is desirably about 100 mm, more desirably about 100 μm.

When the fiber length is at least about 5 μm and at most about 100 mm, elasticity of the sealing material layer can be improved, and since the inorganic fiber can be prevented from being formed like a fuzzball, dispersion with inorganic particles can be maintained. Further, when the fiber length is about 100 µm or less, a thin sealing-material layer can be provided easily.

Examples of the inorganic particle may include carbides, nitrides and the like, and specific examples may include inorganic powders made of silicon carbide, silicon nitride, boron nitride and the like. Each of these may be used alone, or two or more kinds of these may be used in combination. Among the above-mentioned inorganic particles, silicon carbide having superior thermal conductivity is desirably used.

Moreover, when the honeycomb structured body of the present invention is such an assembly-type honeycomb structured body as mentioned above, i.e. when the honeycomb block is configured by binding a plurality of honeycomb units, as the area of the cross-section perpendicular to the longitudinal direction of said honeycomb unit, the lower limit is desirably about 5 $cm^2$, more desirably about 6 $cm^2$, still more desirably about 8 $cm^2$. On the other hand, the upper limit is desirably about 50 $cm^2$, more desirably about 40 $cm^2$, still more desirably about 30 $cm^2$.

When the area is at least about 5 $cm^2$ and at most about 50 $cm^2$, the cross-sectional area of the sealing material layer binding a plurality of honeycomb units becomes small, and the specific surface area for supporting catalysts becomes relatively large, while the pressure loss is controlled to a relatively small value. Since the size of units is not too large, the thermal stress generated at each honeycomb unit is sufficiently suppressed. Moreover, when the cross-sectional area of the honeycomb unit is at least about 5 $cm^2$ and at most about 50 $cm^2$, it becomes possible to adjust the ratio of the sealing material layer accounting for the honeycomb structured-body. This makes it possible to keep the specific surface area per unit volume of the honeycomb structured body large, to highly disperse the catalyst components, and also to maintain the shape as the honeycomb structured body even when external pressure such as thermal shock or vibration is applied. Moreover, because the pressure loss becomes small, the cross-sectional area is desirably about 5 $cm^2$ or more.

In the present specification, the term "the area of the cross-section perpendicular to the longitudinal direction of said honeycomb unit" refers to the area of the cross-section perpendicular to the longitudinal direction of a honeycomb unit which is a base unit comprising a honeycomb structured body, when the honeycomb structured body includes a plurality of honeycomb units having different cross-sectional areas. Normally, the term refers to an area of the cross-section perpendicular to the longitudinal direction of the honeycomb unit having a maximum cross-sectional area.

Moreover, in the assembly-type honeycomb structured body, since its structure is such that a plurality of honeycomb units are bound together through a sealing material layer (adhesive layer), the strength against thermal shock or vibration can be more enhanced.

As the reason for this, it is suggested that even when a temperature distribution is generated on the honeycomb structured body by an extreme temperature change and the like, the temperature difference generated per each honeycomb unit can be suppressed to be small. Or it is suggested that the sealing material layer can reduce the thermal shock or vibration. In addition, in a case where cracks are generated on the honeycomb unit by the thermal stress and the like, the sealing material layer prevents cracks from spreading to the whole honeycomb structured body, further serves as a frame of a honeycomb structured body, and therefore the honeycomb structured body can keep its shape, and also does not lose functions as a catalyst support.

Moreover, the total of the areas of the cross-sections perpendicular to the longitudinal direction of said honeycomb unit desirably accounts for about 85% or more of the area of the cross-section perpendicular to the longitudinal direction of said honeycomb structured body, more desirably about 90% or more.

When the total sum of cross-sectional areas of the honeycomb units accounts for about 85% or more, as the cross-sectional areas of the sealing material layers become small, and the total cross-sectional areas of the honeycomb units become large, the specific surface area used for supporting the catalyst becomes relatively large, while the pressure loss can be controlled to a relatively small value.

Furthermore, when it is about 90% or more, the pressure loss can be more reduced.

In pores in the honeycomb structured body of the present invention, a catalyst, capable of converting CO, HC, $NO_x$ and the like that are contained in exhaust gases, may be supported.

Since such a catalyst is supported, the honeycomb structured body of the present invention functions as a catalyst converter for converting CO, HC, $NO_x$ and the like that are contained in exhaust gases.

The catalyst is not particularly limited, and examples thereof may include noble metals such as platinum, palladium and rhodium, and an alkali metal, alkaline earth metal, oxide, and the like.

These may be used alone or two or more of them may be used in combination.

A catalyst made of the above-mentioned noble metal is a so-called three way catalyst, and the honeycomb structured body of the present invention in which such a three way catalyst is supported functions in the same manner as a known catalyst converter. Accordingly, a detailed description of the case where the honeycomb structured body of the present invention also functions as a catalyst converter is omitted.

However, the catalyst that can be supported in the honeycomb structured body of the present invention is not limited to the above-mentioned noble metals, and an arbitrary catalyst can also be supported as long as it is capable of converting CO, HC, $NO_x$ and the like that are contained in exhaust gases.

As described above, the honeycomb structured body of the present invention is highly resistant to thermal shock because of formation of the irregularities controlled to a predetermined size on the peripheral face of the honeycomb block. Even when a high pressure is applied from the peripheral face of the honeycomb structured body, crack or breakage does not easily occur, and the honeycomb structured body therefore has excellent durability.

Moreover, since the honeycomb unit comprising the honeycomb structured body comprises inorganic particles as well as inorganic fibers and/or whiskers, the specific surface area is improved by the inorganic particles, and also the strength of the honeycomb unit is improved by the inorganic fibers and/or whiskers.

The honeycomb structured body of the present invention as described above can be suitably applied to a catalyst converter or the like.

In the honeycomb structured body of the present invention, it is desirable that the center-of-gravity c1 does not correspond to the center-of-gravity c2. As described above, this honeycomb structured body is referred to as a center-of-gravity divergent-type honeycomb structured body.

In such a center-of-gravity divergent-type honeycomb structure, it is easier to manufacture a minute curved-type honeycomb structured body, i.e., a honeycomb structured body in which when the centers-of-gravities c2 of the least square curves are obtained at three points or more along the longitudinal direction of said honeycomb block, at least one of the centers-of-gravities $c2$ are not present in the same straight line parallel to the longitudinal direction of said honeycomb block, or when the centers-of-gravities $c1$ of the least square curves are obtained at three points or more along the longitudinal direction of said honeycomb structured body, at least one of the centers-of-gravities $c1$ are not present in the same straight line parallel to the longitudinal direction of said honeycomb structured body.

Further, when this center-of-gravity divergent-type honeycomb structured body is used as the exhaust gas converting apparatus, holding durability increases. Although this mechanism is not exact, it is considered that in the center-of-gravity divergent-type honeycomb structured body, thermal conductivity becomes good in some parts and poor in other parts when heat transmits from the central portion to the periphery of the filter. Therefore, heat induces fatigue, corrosion, crystallization, or the like, of a holding mat in the location having good thermal conductivity, to deteriorate holding force, but in the opposite direction, holding force is relatively maintained. It is thus thought that compressive force is applied to the location suffered with heat fatigue, thereby preventing a decrease in push-out load.

It is also noted that the distance between $c1$ and $c2$ is desirably at least about 0.1 mm and at most about 10.0 mm. When the distance between $c1$ and $c2$ is at least about 0.1 mm and at most about 10.0 mm, the curves are not concentric and hence the push-out strength increases. Moreover, the temperature distribution is not reversed, preventing the holding force is from being reversed.

Figure 6A:
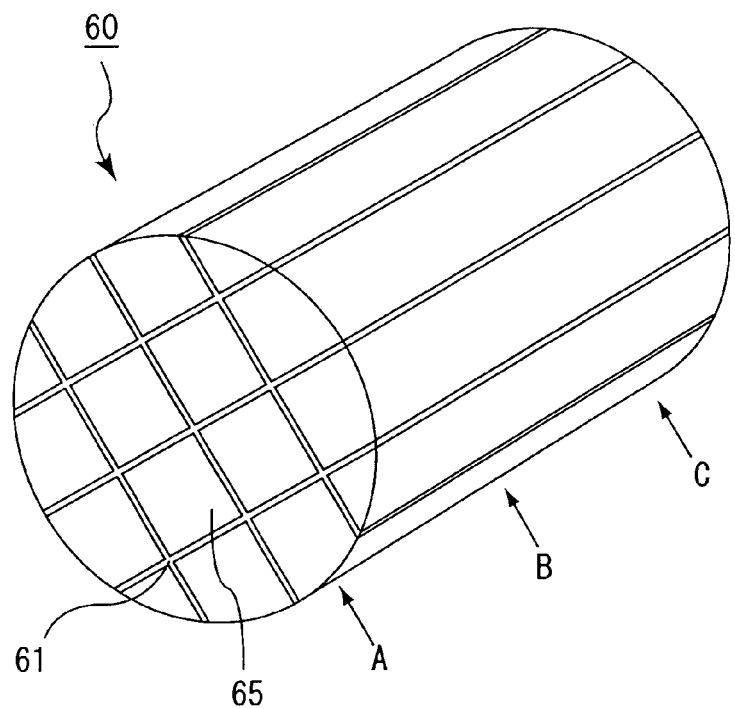
FIG. 6A is a perspective view that schematically shows other example of the honeycomb structured body of the present invention.
Figure 6B:
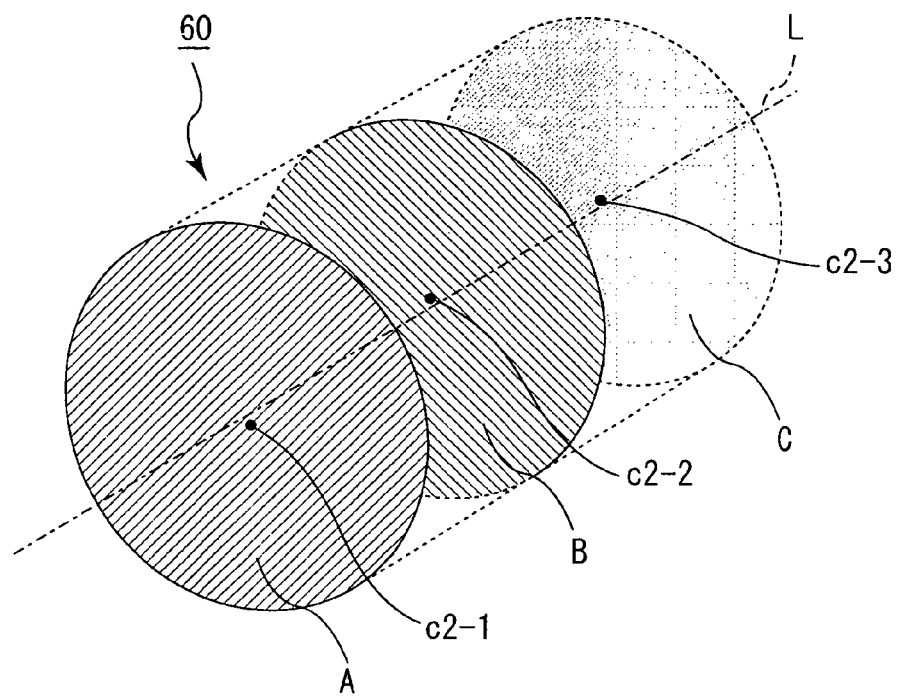
FIG. 6B is a perspective view that schematically shows cross-sectional curves drawn by the contours of cross-sections perpendicular to the longitudinal direction of the honeycomb block, which are taken at A, B and C of the honeycomb structured body shown in FIG. 6A.

FIG. 6A is a perspective view that schematically shows one example of a honeycomb block for use in the minute curved-type honeycomb structured body of the present invention, and FIG. 6B is a perspective view that schematically shows cross-sectional curves drawn by contours of cross-sections perpendicular to the longitudinal direction of the honeycomb block, which are taken at A, B and C of the honeycomb structured body shown in FIG. 6A.

As shown in FIG. 6A, a minute curved-type honeycomb structured body 60 comprises a pillar-shaped honeycomb block configured by binding a plurality of honeycomb units 65, in which a number of cells are placed in parallel in the longitudinal direction with a cell wall therebetween through sealing material layer (adhesive layer) 61. Namely, the minute curved-type honeycomb structured body 60 has the substantially same structure as that of the honeycomb structured body 10 shown in FIG. 1, which is an assembly-type honeycomb structured body.

In the minute curved-type honeycomb structured body, irregularities are formed on the peripheral face of the honeycomb block.

In the honeycomb structured body of the present invention, as described above using FIGS. 2A to 2C and FIGS. 5A and 5B, the irregularities formed on the peripheral face of the honeycomb block may be formed by partially removing the cells comprising the honeycomb block, exposing the remaining portion at the peripheral face, or the irregularities may be formed stepwise.

Further, the size of the irregularities that are formed on the peripheral face of the honeycomb block is desirably controlled to the same size of the irregularities that are formed on the honeycomb structured body of the present invention. With this size control, the honeycomb structured body has excellent isostatic strength.

As described above, the minute curved-type honeycomb structured body is a honeycomb structured body in which when the centers-of-gravities $c2$ of the least square curves (hereinafter, also referred to as cross-sectional curves) are obtained at three points or more along the longitudinal direction of a honeycomb block, at least one of the centers-of-gravities $c2$ are not present in the same straight line parallel to the longitudinal direction of the honeycomb block, or a honeycomb structured body, in which when the centers-of-gravities $c1$ of the least square curves are obtained at three points or more along the longitudinal direction of the honeycomb structured body, at least one of the centers-of-gravities $c1$ are not present in the same straight line parallel to the longitudinal direction of the honeycomb structured body.

That is to say, as shown in FIG. 6B, at least one of the centers-of-gravities $c2$-1, $c2$-2 and $c2$-3 of the least square curves, which are determined by the least square method based on points comprising contours of cross-sectional sections perpendicular to the longitudinal direction of the honeycomb block of the honeycomb structured body 60, are not present in the same straight line L parallel to the longitudinal direction of the honeycomb block.

The studies conducted by the present inventor have revealed that push-out strength of a honeycomb structured body is greatly concerned with a position of a center-of-gravity of a cross-sectional curve drawn by the contour of a cross-section perpendicular to the longitudinal direction of a honeycomb block of the honeycomb structured body, and push-out strength of the honeycomb structured body becomes excellent when the center-of-gravity $c2$ of one cross-sectional curve and the center-of-gravity $c2$ of another cross-sectional curve in the honeycomb block are positioned differently within a predetermined range with respect to a straight line parallel to the longitudinal direction of the honeycomb block.

Here, "push-out strength of the honeycomb structured body" means strength limitations with which a honeycomb structured body in the state of being held and fixed by holding the entire peripheral face of the honeycomb block by a pre-determined member, can be counteract to an external force (such as a pressure or the like) to be applied from the one end face of the honeycomb structured body without causing displacement.

This reason is not clear, but may be considered as follows.

When an external force such as a pressure or the like is applied to the one end face of the honeycomb structured body in the state of being held and fixed by holding the entire peripheral face of the honeycomb structured body by a pre-determined member, a stress attributed to the external force is generated from one end face of the honeycomb block to the other end face inside the honeycomb structured body.

It is considered that, at this time, if a center-of-gravity of one cross-sectional curve and a center-of-gravity of another cross-sectional curve in the honeycomb block are present in the same straight line parallel to the longitudinal direction of the honeycomb block, the stress generated in the honeycomb block is transmitted straightforward from the one end face to another end face of the honeycomb block, thereby increasing a force that acts between the honeycomb structured body and the member for holding the honeycomb structured body. As a result, the push-out strength of the honeycomb structured body decreases.

It is considered, on the other hand, that when the center-of-gravity $c2$ of one cross-sectional curve and the center-of-gravity $c2$ of another cross-sectional curve in the honeycomb block are not present in the same straight line parallel to the longitudinal direction of the above-mentioned honeycomb block, the stress generated in the honeycomb block is dispersed while transmitted from the one end face to another end face of the honeycomb block, thereby decreasing a force that acts between the honeycomb structured body and the member for holding the honeycomb structured body. As a result, the push-out strength of the honeycomb structured body increases.

In order to increase the push-out strength of the minute curved-type honeycomb structured body as described above, positional dispersions of centers-of-gravities of cross-sectional curves perpendicular to the longitudinal direction of the honeycomb block need to be controlled within a predetermined range.

In the following, the positional dispersions of centers-of-gravities of the cross-sectional curves are specifically described using the honeycomb structured body 60 and the like shown in FIGS. 6A and 6B.

In order to obtain the positional dispersions of the centers-of-gravities c2 of the cross-sectional curves perpendicular to the longitudinal direction of the honeycomb block in the minute curved-type honeycomb structured body, first, positional data concerning the center-of-gravity c2-1 of the cross-sectional curve A, positional data concerning the center-of-gravity c2-2 of the cross-sectional curve B and positional data concerning the center-of-gravity c2-3 of the cross-sectional curve C, of the minute curved-type honeycomb structured body 60 are obtained, and then drawing a least square straight line (not shown) obtained from the respective positional data concerning the centers-of-gravities c2-1, c2-2 and c2-3.

The method for obtaining positional data concerning the center-of-gravity c2 of the cross-sectional curve is not particularly limited, and for example, positional data can be measured using the above-mentioned three dimensional measurement apparatus.

Further, the number of the positional data to be determined, concerning the centers-of-gravities c2 of cross-sectional curves, is not limited as long as it is at least three or more. This is because, when the number of data to be measured, concerning the centers-of-gravities c2 of the cross-sectional curves, is less than three, it is difficult to draw a least square straight line showing the centers of similitude of the cross-sectional curves perpendicular to the longitudinal direction of the honeycomb block.

Also note that, although the number of positional data to be measured, concerning the centers of similitude of the cross-sectional curves, is not limited as long as it is at least three or more, the number of the positional data is desirably five or more, and desirably, each is measured equally spaced. This is because it is possible to more precisely obtain positional dispersions of centers-of-gravities of cross-sectional curves perpendicular to the longitudinal direction of the honeycomb block.

Next, a distance $r_1$ between the center-of-gravity c2-1 of the cross-sectional curve A and the least square straight line, a distance $r_2$ between the center-of-gravity c2-2 of the cross-sectional curve B and the least square straight line, and a distance $r_3$ between the center-of-gravity c2-3 of the cross-sectional curve C and the least square straight line are determined respectively. These $r_1$ to $r_3$ are determined from the lengths of perpendicular lines dropped from the respective centers-of-gravities c2-1 to c2-3 to the least square straight line.

Subsequently, a distance D3-1 from the center-of-gravity c2-1 to the outermost point of the cross-sectional curve A, a distance D3-2 from the center-of-gravity c2-2 to the outermost point of the cross-sectional curve B, and a distance D3-3 from the center-of-gravity c2-3 to the outermost point of the cross-sectional curve C are determined respectively.

In the above-mentioned honeycomb structured body, a ratio of a distance between the center-of-gravity and the least square straight line drawn by the least square method based on the positional data of the center-of-gravity to a distance between the center-of-gravity and the outermost point of the least square curve is desirably at least about 0.1% and at most about 3%.

Namely, in the honeycomb structured body 60, $r_1$ with respect to D3-1, $r_2$ with respect to D3-2, and $r_3$ with respect to D3-3 are desirably at least about 0.1% and at most about 3% respectively. When the ratio is at least about 0.1% and at most about 3%, there is a positional dispersion of the centers-of-gravities of the cross-sectional curves perpendicular to the longitudinal direction of the honeycomb block, which enhances the push-out strength of the honeycomb structured body. Moreover, the non-uniformity of the surface thickness of the honeycomb block can be decreased, and for example when the above-mentioned honeycomb structured body is installed in a casing through a mat-like holding sealing material so as to be used as an exhaust gas converting apparatus, the rattle during use thereof can be suppressed, thereby enhancing the push-out strength, and further enhancing durability. Furthermore, the installation of the honeycomb structured body in the casing itself becomes easy.

Examples of other configurations of the minute curved-type honeycomb structured body and examples of the materials comprising this honeycomb structured body and the like are the same as those of the above-mentioned honeycomb structured body of the present invention described as an assembly-type honeycomb structured body, and the detailed description of other examples of the minute curved-type honeycomb structured body is thus omitted.

Meanwhile, the center-of-gravity divergent-type honeycomb structured body and the minute curved-type honeycomb structured body may also be allowed to function as a honeycomb filter for converting exhaust gases or a catalyst converter, as in the case of the above-mentioned honeycomb structured body of the present invention.

As described above, in the minute curved-type honeycomb structured body, irregularities are formed on the peripheral face of the honeycomb block, and a center-of-gravity of a cross-sectional curve drawn by the contour of a cross-section perpendicular to the longitudinal direction of the honeycomb block and a center-of-gravity of another cross-sectional curve drawn by the contour of another cross-section perpendicular to the longitudinal direction of the honeycomb block are not present in the same straight line parallel to the longitudinal direction of the honeycomb block, and positional dispersions of the centers-of-gravities are controlled within a predetermined range, thereby leading to excellent push-out strength and durability.

Accordingly, for example, even when the minute curved-type honeycomb structured body is installed as an exhaust gas converting apparatus in a casing through a mat-like holding sealing material or the like and a pressure by exhaust gas or the like is applied from the one end face side of the honeycomb structured body, the honeycomb structured body is hardly displaced in the casing.

Such a minute curved-type honeycomb structured body can be also preferably used as a catalyst converter and the like.

Next, the manufacturing method of the honeycomb structured body according to the present invention will be described.

The honeycomb structured body of the present invention can be produced, for example, by the following manufacturing method (the first aspect of the manufacturing method).

The first aspect of the manufacturing method comprises the step of: processing a peripheral face of a ceramic dried body obtained by drying a ceramic formed body that contains a ceramic material comprising each of said honeycomb units so as to form a plurality of kinds of ceramic dried bodies having different shapes.

In the first aspect of the manufacturing method, first, a ceramic formed body formation process is performed, in which a mixed composition including a ceramic material comprising the honeycomb units is prepared and the obtained mixed composition is subjected to extrusion molding to form rectangular pillar-shaped ceramic molded bodies.

The above-mentioned mixed composition certainly contains the inorganic particles, and the inorganic fibers and/or whiskers. And in addition to these, the above-mentioned inorganic binder, organic binder, dispersion medium, molding auxiliary, and the like may be appropriately added.

As the organic binder, there may be mentioned methylcellulose, carboxy methylcellulose, hydroxy ethylcellulose, polyethylene glycol, phenol resins, epoxy resins and the like. These may be used alone, or two or more of them may also be used in combination.

A blending quantity of the above-mentioned organic binders is preferably about 1 to 10 parts by weight with respect to 100 parts by weight of the above-mentioned inorganic particles, inorganic fibers, whiskers and an inorganic binder in total.

The dispersion medium is not particularly limited, and examples thereof may include water, and an organic solvent such as benzene, as well as alcohol such as methanol. The dispersion medium is blended in an appropriate amount such that the viscosity of the mixed, composition is set within a certain range.

The molding auxiliary is not particularly limited, and examples thereof may include ethylene glycol, dextrin, fatty acid, fatty acid soap, polyalcohol and the like.

In the manufacturing method of the honeycomb structured body, these materials are mixed by a mixer, attritor or the like, and sufficiently kneaded by a kneader or the like, to prepare the mixed composition.

Moreover, the mixed composition is desirably such that the honeycomb structured body to be manufactured has the porosity of at least about 20% and at most about 80%.

The mixed composition is subjected to extrusion molding to form pillar-shaped molded bodies each comprising a plurality of cells that are placed in parallel in the longitudinal direction with a cell wall therebetween, and each of the molded bodies is cut into a predetermined length to form rectangular pillar-shaped ceramic molded bodies each having the substantially same shape as that of the honeycomb unit 20 as shown in FIG. 2A.

Next, the above-mentioned ceramic molded body is dried by using a microwave dryer, a hot-air dryer, a dielectric dryer, a decompression dryer, a vacuum dryer, a freeze dryer or the like, to form a ceramic dried body.

Subsequently, a periphery processing process is performed, in which the ceramic dried body is subjected to peripheral processing, to form a plurality of kinds of ceramic dried bodies having different shapes. Specifically, a portion of cells which has the substantially same shape as that of either the honeycomb unit 200 or 210 shown in FIGS. 2B and 2C is partially removed to expose the remaining portion at the peripheral face to form a ceramic dried body with irregularities formed thereon. This is because after a firing process to be described, a plurality of kinds of honeycomb units having different shapes are manufactured, and in a subsequent block formation process, those pluralities of kinds of honeycomb units having different shapes are combined and bonded to form a substantially cylindrical honeycomb block having irregularities on the peripheral face thereof.

With regard to the method for processing the periphery of the ceramic dried body, the method for forming a plurality of kinds of ceramic dried bodies having different shapes is not particularly limited, and examples thereof may include: a method disclosed in JP-A 2000-001718, in which a cylindrical cutting member with a grind stone formed at one end, having an inner diameter adjusted to the substantially same length as that of the outer diameter of a honeycomb block, is shifted in the longitudinal direction while rotated about the center of the cylinder as a rotation axis, so as to partially cut off the outer peripheries of rectangular pillar-shaped ceramic dried bodies from the one end face side thereof; and a method disclosed in JP-A 2000-001719, in which a cylindrical cutting member with a grind stone disposed in a portion including the peripheral portion of a cylindrical base metal part, is brought into contact with the periphery of rectangular pillar-shaped ceramic dried bodies and the cutting member is shifted along the longitudinal direction of the ceramic dried bodies while rotated about the center of the base metal part as a rotation axis, so as to partially cut off the peripheries of the ceramic dried bodies.

The contents of JP-A 2000-001718 and JP-A 2000-001719 are incorporated herein by reference in their entirety.

In above peripheral processing process, the size of irregularities that are formed on part of the peripheral face of the ceramic dried body is arbitrarily determined according to the size of an aimed honeycomb structured body, but the size of the irregularities is adjusted such that a size of irregularities that are formed on the peripheral face of a honeycomb block, to be formed through a after-mentioned honeycomb block formation process, is the same as the size of the irregularities that are formed on the peripheral face of the honeycomb block in the above-mentioned honeycomb structured body of the present invention.

Incidentally, in the case of performing a later-mentioned coating layer formation process, irregularities may be formed on the peripheral faces of the ceramic dried bodies such that the size of the irregularities that are formed on the peripheral face of the honeycomb block to be formed in the honeycomb block formation process is larger than the size of the irregularities that are formed on the peripheral face of the honeycomb block in the honeycomb structured body of the present invention, and in the subsequent coating layer formation process, the size of the irregularities formed on the peripheral faces of the ceramic dried bodies may be adjusted by a coating layer to be formed on the peripheral face of the honeycomb block.

Next, a degreasing process is performed, in which the above-mentioned plurality of kinds of ceramic dried bodies having different shapes are heated to remove a binder contained in the ceramic dried bodies so as to obtain ceramic degreased bodies.

The decreasing process of the ceramic dried body is normally performed by placing the ceramic dried body on a jig for degreasing, and then installing the ceramic dried body in a decreasing furnace, followed by heating at 400° C. for about 2 hours. This leads to sublimation, decomposition and elimination of most of the above binder and the like.

A firing process is then performed in which the ceramic dried body is fired by heating at least about 600° C. and at most about 1200° C. and the ceramic powder is then sintered to manufacture a honeycomb unit.

The reason for this is because, when the firing temperature is at least about 600° C. and at most about 1200° C., sintering of ceramic particles and the like proceed sufficiently, and the strength as a honeycomb structured body is enhanced. Furthermore, sintering of ceramic particles and the like is controlled from proceeding too much to increase the specific surface area per unit volume, and catalyst components can be sufficiently dispersed in a high level when a catalyst is supported.

In addition, more desirable sintering temperature is at least about 600° C. and at most about 1000° C.

It is to be noted that the sequent processes from the degreasing process to the firing process is preferably performed while the ceramic dried body is placed on the jig for firing and remains placed thereon during the degreasing process and the firing process. This allows the degreasing process and the firing process to be effectively performed, and can prevent the ceramic dried body from being damaged when being placed on a different jig or in some other occasions.

Next, a honeycomb block formation process is performed, in which a plurality of kinds of honeycomb units having different shapes as thus manufactured are combined through a sealing material (adhesive) paste to form a substantially cylindrical honeycomb block.

In this honeycomb block formation process, for example, the sealing material (adhesive) paste is applied on the substantially entire surface of each side face of the honeycomb unit, using a brush, a squeegee, a roll or the like, to form a sealing material (adhesive) paste layer having a predetermined thickness.

After the formation of this sealing material (adhesive) paste layer, a process for bonding another honeycomb unit is successively repeated to form a cylindrical ceramic laminated body having a predetermined size, like the honeycomb structured body 10 shown in FIG. 1.

Herein, the number of honeycomb units to be bonded to one another through the sealing material (adhesive) paste layer is arbitrarily determined in consideration of the shape, size and the like of an aimed honeycomb block.

It should be noted that honeycomb units having the shapes shown in FIGS. 2B and 2C are desirably used in the vicinity of the periphery of the ceramic laminated body, and honeycomb units having the shape shown in FIG. 2A is desirably used in the portion other than the vicinity of the periphery of the ceramic laminated body. In this manner, a cylindrical honeycomb block can be formed. On the peripheral face of such a ceramic laminated body, irregularities are formed by partially cutting off cells, followed by exposing the remaining portion at the peripheral face.

Next, the ceramic laminated body as thus formed is heated for example under conditions of a temperature of at least about 50° C. and at most about 150° C. for about one hour, to dry and solidify the sealing material (adhesive) paste layer so as to form a sealing material layer (adhesive layer), and thereafter, a honeycomb block configured by binding a plurality of honeycomb units to one another through the sealing material layer (adhesive layer) is formed so that an assembly-type honeycomb structured body is manufactured.

Examples of the material comprising the sealing material (adhesive) paste include the same as the examples of the material comprising the sealing material layer (adhesive layer), as mentioned in the explanation of the honeycomb structured body of the first aspect of the present invention.

Although a small amount of moisture, solvent and the like may further be contained in the sealing material layer (adhesive layer) formed with the sealing material (adhesive) paste, normally, such moisture and solvent and the like are almost scattered through heating or the like after application of the sealing material (adhesive) paste.

In this manufacturing method, after formation of the honeycomb block, a sealing material layer (coating layer) formation process is performed, in which the sealing material layer (coating layer) is formed on the peripheral face of the honeycomb block.

The sealing material layer (coating layer) is formed while the periphery portion is processed to control the size of irregularities that are formed on the peripheral face of the honeycomb structured body.

Although the material comprising the sealing material layer (coating layer) is not particularly limited, those including heat resistant materials such as inorganic fibers, inorganic binders and the like are desirably used. The sealing material layer (coating layer) may be composed of the same material as the above-mentioned material comprising the sealing material layer (adhesive layer).

The method for forming the sealing material layer (coating layer) is not particularly limited, and examples thereof may include the following method: using a supporting member comprising a rotating means, the honeycomb block is supported in the direction of the rotating axis and rotated therearound, and a clotted sealing material (coating) paste to become the above-mentioned sealing material layer (coating layer) is allowed to adhere to the periphery of the rotating honeycomb block. The sealing material (coating) paste is then stretched using a plate member or the like to form a sealing material (coating) paste layer, and then dried for example at a temperature of about 120° C. or more to evaporate moisture, and thereby a sealing material layer (coating layer) is formed on the peripheral portion of the honeycomb block.

As described above, according to the first aspect of the manufacturing method of the present invention, since ceramic, a brittle material, is not subjected to cutting, it is possible to manufacture a honeycomb structured body including a honeycomb block with a structure that irregularities are formed on the peripheral face thereof and a plurality of honeycomb units are bound to one another through sealing material layer (adhesive layer), without cracks at the periphery of the honeycomb block.

Further, according to the first aspect of the manufacturing method of the present invention, the honeycomb structured body of the present invention in which the size of the irregularities that are formed on the peripheral face of the honeycomb block is controlled within a predetermined range can be manufactured by adjusting the size of irregularities that are formed on part of the peripheral face of ceramic dried bodies in the peripheral processing process, or adjusting the thickness of the sealing material layer (coating layer) formed on the peripheral face of the honeycomb block in the sealing material layer (coating layer) formation process.

Moreover, in the first aspect of the manufacturing method, a plurality of kinds of ceramic dried bodies having different shapes are previously formed in the peripheral processing process, and then using those ceramic dried bodies, the degreasing process and the firing process are performed, and thereafter, warpage occurs somewhat in the honeycomb unit to be manufactured. Therefore, in the honeycomb structured body which is manufactured while controlling the orientation and the size of the above-mentioned warp of the honeycomb units by the thickness or the like of the sealing material layer (adhesive layer), a center-of-gravity of a cross-sectional curve formed by the contour of a cross-section perpendicular to the longitudinal direction of the honeycomb block and a center-of-gravity of another cross-sectional curve formed by the contour of another cross-section perpendicular to the longitudinal direction of the honeycomb block are not present in the same straight line parallel to the longitudinal direction of the honeycomb block. Namely, it is possible to manufacture a center-of-gravity divergent-type honeycomb structured body by the first aspect of the manufacturing method of the present invention.

Moreover, the honeycomb structured body according to the present invention can also be produced by the after-mentioned manufacturing method (second aspect of the manufacturing method of the present invention).

The second aspect of the manufacturing method of the present invention comprises the step of performing extrusion molding to form ceramic molded bodies having a plurality of kinds of cross-sectional shapes.

In the second aspect of the manufacturing method, a ceramic formed body formation process is first performed, in which a mixed composition including a ceramic material comprising the honeycomb units is prepared and ceramic molded bodies having a plurality of kinds of cross-sectional shapes are then formed using the mixed composition.

Namely, in the second aspect of the manufacturing method, the mixed composition is subjected to extrusion molding to form rectangular pillar-shaped ceramic molded bodies and ceramic molded bodies with irregularities partially formed on the peripheral face thereof.

Here, the irregularities of the ceramic formed body with the irregularities partially formed on the peripheral face thereof may be formed by partially cutting off cells, exposing the remaining portion at the peripheral face, as in the case of the honeycomb units 20, 200 and 210 shown in FIGS. 2A to 2C, or the irregularities may be for example formed stepwise, as in the case of the honeycomb unit comprising the vicinity of the periphery of the honeycomb structured body 50 shown in FIG. 5A.

The size of the irregularities that are formed on a part of the peripheral face of the ceramic formed body is arbitrarily determined according to the size of an aimed honeycomb structured body, and desirably controlled to the same size as the size of the irregularities that are formed on a part of the peripheral face of the ceramic dried body in the manufacturing method of the present invention. This is because the honeycomb structured body of the present invention which has excellent isostatic strength can be manufactured by the second aspect of the manufacturing method.

Thereafter, using the formed ceramic molded bodies having a plurality of kinds of cross-sectional shapes, the same drying process, degreasing process, firing process and honeycomb block formation process as those in the first aspect of the manufacturing method are performed, and the sealing material layer (coating layer) formation process is also performed if necessary, to manufacture a honeycomb structured body having irregularities formed on the peripheral face of the honeycomb block.

As described above, according to the second aspect of the manufacturing method of the present invention, since ceramic, a brittle material, is not subjected to cutting, it is possible to manufacture a honeycomb structured body including a honeycomb block with a structure that irregularities are formed on the peripheral face thereof and a plurality of honeycomb units are bound to one another through sealing material layer (adhesive layer), without cracks at the periphery of the honeycomb block.

Further, according to the second aspect of the manufacturing method, adjusting the size of irregularities that are formed on part of the outer peripheral face of ceramic molded bodies in the ceramic formed body formation process, or adjusting the thickness of the sealing material layer (coating layer) formed on the outer peripheral face of the honeycomb block in the sealing material layer (coating layer) formation process, allows manufacturing of the honeycomb structured body of the present invention in which the size of the irregularities that are formed on the outer periphery of the honeycomb block is controlled within a predetermined range.

Moreover, in the second aspect of the manufacturing method, a plurality of kinds of ceramic dried bodies having different shapes are previously formed in the peripheral processing process, and then using those ceramic dried bodies, the degreasing process and the firing process are performed, and thereafter, warpage occurs somewhat in the honeycomb unit to be manufactured. Therefore, in the honeycomb structured body which is manufactured while controlling the orientation and the size of the above-mentioned warp of the honeycomb units by the thickness of the sealing material layer (adhesive layer) or the like, a center-of-gravity of a cross-sectional curve formed by the contour of a cross-section perpendicular to the length direction of the honeycomb block and a center-of-gravity of another cross-sectional curve formed by the contour of another cross-section perpendicular to the length direction of the honeycomb block are not present in the same straight line parallel to the longitudinal direction of the honeycomb block. Namely, it is possible to manufacture a center-of-gravity divergent-type honeycomb structured body by the second aspect of the manufacturing method of the present invention.

The manufacturing methods of the honeycomb structured body described hereinbefore are manufacturing methods of an assembly-type honeycomb structured body. However, as mentioned above, the honeycomb structured body of the present invention may be an integral-type honeycomb structured body. In this case, in the manufacturing methods mentioned above, the honeycomb structured body can be manufactured by preparing a mixed composition containing a ceramic material, subjecting the composition to extrusion molding for forming a desired shape, carrying out drying, degreasing and firing processes, followed by forming an integral-type honeycomb structured body, and then forming a predetermined sealing material layer (coating layer) on the peripheral faces of the resulting integral-type honeycomb structured body.

Next, an exhaust gas purifying (converting) apparatus of the present invention is described.

An exhaust gas purifying apparatus of the present invention comprises the honeycomb structured body of the present invention which is installed in a casing connected to an exhaust passage of an internal combustion engine through a mat-like holding sealing material.

Figure 7:
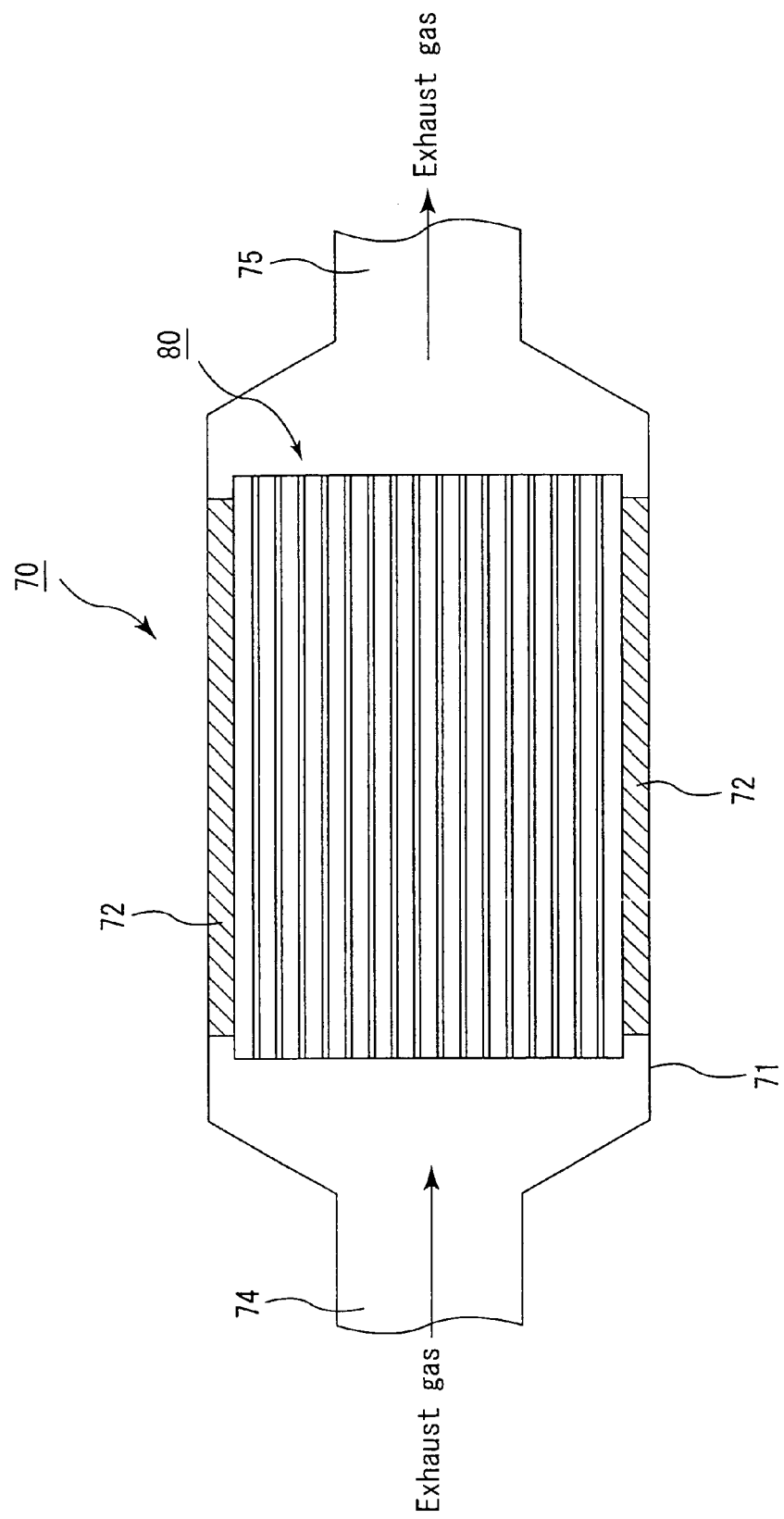
FIG. 7 is a cross-sectional view that schematically shows one example of an exhaust gas converting apparatus of the present invention.
Figure 8A:
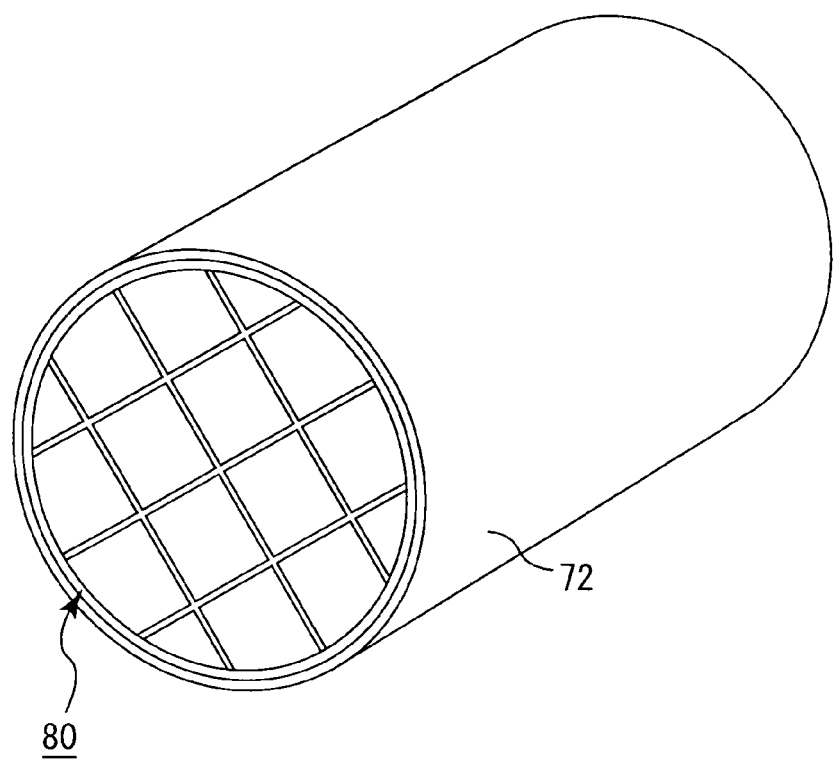
FIG. 8A is a perspective view that schematically shows one example of a honeycomb structured body wrapped with a mat-like holding sealing material in the exhaust gas converting apparatus shown in FIG. 7.
Figure 8B:
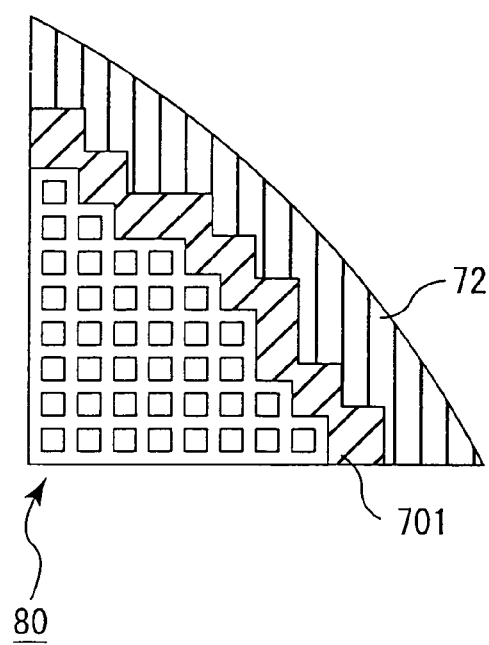
FIG. 8B is a partially enlarged cross-sectional view of the honeycomb structured body shown in FIG. 8A.

FIG. 7 is a cross-sectional view that schematically shows one example of an exhaust gas converting apparatus of the present invention, and FIG. 8A is a perspective view that schematically shows one example of a honeycomb structured body wrapped with a mat-like holding sealing material, in the exhaust gas converting apparatus shown in FIG. 7; FIG. 8B is a partially enlarged cross-sectional view of the honeycomb structured body shown in FIG. 8A.

As shown in FIG. 7, an exhaust gas converting apparatus 70 of the present invention is mainly composed of a honeycomb structured body 80, a casing 71 that covers the outer side of the honeycomb structured body 80, and a mat-like holding sealing material 72 disposed between the honeycomb structured body 80 and the casing 71, and an introduction pipe 74 coupled to an internal combustion engine such an engine or the like is connected to the end of the exhaust gas inlet side of the casing 71, while an exhaust pipe 75 coupled to the outside is connected to the other end of the casing 71. Herein, the arrows in FIG. 7 show flows of the exhaust gas.

Meanwhile, in the exhaust gas converting apparatus 70 of the present invention, the honeycomb structured body 80 may be the honeycomb structured body of the present invention as shown in FIGS. 1, 3 and FIGS. 5A and 5B, or may be the second honeycomb structured body of the present invention as shown in FIG. 6A.

When the exhaust gas converting apparatus 70 of the present invention functions as a so-called catalyst converter for converting CO, HC, $NO_x$ and the like that are contained in exhaust gases, a catalyst capable of converting CO, HC, $NO_x$ and the like that are contained in exhaust gases is supported on the surface of the cell wall, or in the pores, of the honeycomb structured body 80.

As the catalyst, there may be mentioned, for example, noble metals such as platinum, palladium and rhodium, an alkali metal, alkaline earth metal, oxide, and the like. These may be used alone or two or more of them may be used in combination.

Namely, when above case, in the exhaust gas converting apparatus 70, exhaust gas discharged from an internal combustion engine such as an engine or the like is introduced into the casing 71 through the inlet pipe 74 in passing through the cells of the honeycomb structured body 80 (converter filter), the exhaust gas is converted by contact between a catalyst and CO, HC, $NO_x$ and the like that are contained in the exhaust gas, and then discharged outside through the exhaust pipe 75.

In the exhaust gas converting apparatus 70 of the present invention, as shown in FIG. 8B, a sealing material (coating material) 701 is formed on irregularities portion formed on the peripheral face of the honeycomb structured body 80 (honeycomb block), irregularities are further formed on the peripheral face of the sealing material (coating material) 701, and the honeycomb structured body 80 (honeycomb block) with the sealing material (coating material) 701 formed thereon is then assembled in the casing 71 through the mat-like holding sealing material 72.

The honeycomb structured body 80 is held by the mat-like holding sealing material 72 in the above-mentioned manner, hence a so-called anchor effect can be provided between the honeycomb structured body 80 and the mat-like holding sealing material 72, preventing occurrence of displacement between the honeycomb structured body 80 and the mat-like holding sealing material 72 in use of the apparatus, thereby improving durability of the exhaust gas converting apparatus 70 of the present invention, additionally preventing leakage of exhaust gas from the peripheral portion of the honeycomb structured body 80.

Especially in the case where the honeycomb structured body in the exhaust gas converting apparatus of the present invention is a center-of-gravity divergent-type honeycomb structured body or a minute curved-type honeycomb structured body, as described above, since the center-of-gravity divergent-type honeycomb structured body and the minute curved-type honeycomb structured body have highly excellent push-out strength, the honeycomb structured body is not displaced out of the direction of the exhaust gas flow even when large pressure is applied to one end face of the honeycomb structured body by the exhaust gas flown into the casing through the inlet tube. Accordingly, the exhaust gas converting apparatus of the present invention has highly excellent durability.

Incidentally, in FIG. 8B, the irregularities formed on the peripheral face of the honeycomb block in the honeycomb structured body 80 are stepwise as in the case of the honeycomb structured body 50 shown in FIG. 5A, however, those irregularities may be formed by partially removing cells that comprises the honeycomb block, exposing the remaining portion at the peripheral face as shown in FIG. 2 or 3.

The mat-like holding sealing material 72 holds and fixes the honeycomb structured body 80 in the casing 71, as well as functions as a heat insulating material for keeping the temperature of the honeycomb structured body 80 in use.

The material for comprising such mat-like holding sealing material 72 is not particularly limited, and examples thereof may include inorganic fibers such as crystal alumina fibers, alumina-silica fibers, mullite, silica fibers and the like, and fibers including one kind or more of those inorganic fibers.

Moreover, the above examples also include a non-expansive mat substantially free from vermiculite, and a low-expansive mat including a small amount of vermiculite, and among these, the non-expansive mat substantially free from vermiculite is preferably used.

As the mat-like holding sealing material, a non-expansive ceramic fibrous mat is particularly desirable.

Further, the mat-like holding sealing material 72 desirably contains alumina and/or silica. This is because thermal resistance and durability of the mat-like holding sealing material 72 become excellent. In particular, the mat-like holding sealing material 72 desirably contains about 50% by weight or more of alumina. This is because elastic force of the mat-like holding sealing material 72 is enhanced even at high temperatures of at least about 900° C. and at most about 950° C., thereby force for holding the honeycomb structured body 80 is increased.

Moreover, the mat-like holding sealing material 72 is desirably subjected to needle punching treatment. This is because fibers comprising the holding sealing material 72 are tangled with one another to enhance elastic force, to improve force for holding the honeycomb structured body 80.

As shown in FIG. 8A, the mat-like holding sealing material 72 made of the materials as described above is desirably wrapped around the honeycomb structured body 80 so as to cover the subsequently entire peripheral face thereof. This is because the honeycomb structured body 80 is uniformly, imparting excellent holding stability to the honeycomb structured body 80.

As described above, in the exhaust gas converting apparatus of the present invention, the honeycomb structured body of the present invention is assembled in the casing, with the mat-like holding sealing material filling the recesses on the peripheral face of the honeycomb block of the honeycomb structured body, and hence a so-called anchor effects is generated between the honeycomb block and the mat-like holding sealing material, imparting excellent holding stability to the honeycomb structured body.

Therefore, the exhaust gas converting apparatus of the present invention can retain excellent durability without decrease in a holding force of honeycomb structured body by a mat-like holding sealing material and displacement of the honeycomb structured body, caused by rise in pressure of exhaust gas flown into a casing in use and increased temperature of the honeycomb structured body.

EXAMPLES

The present invention will be described in detail by way of examples below; however, it is not intended that the present invention be limited by following examples.

Example 1

(1) 40% by weight of γ alumina particles (average particle diameter 2 μm), 10% by weight of silica-alumina fibers (average fiber diameter 0.10 μm, average fiber length 100 μm, aspect ratio 10) and 50% by weight of silica sol (solid concentration 30% by weight) were mixed. To 100 parts by weight of the obtained mixture were added 6 parts by weight of methyl cellulose as an organic binder, and small amounts of a plasticizer and lubricant, and further mixed and kneaded to obtain a mixed composition. Then, this mixed composition was subjected to extrusion molding using an extrusion molding machine to obtain a raw molded body. This raw molded body was rectangular pillar shape (34.3 mm×34.3 mm×300 mm) and had the cell density of $31/cm^2$ and cell wall thickness of 0.35 mm.

(2) Next, the raw molded body was sufficiently dried using a microwave drier and hot air drier to obtain a ceramic dried body. Thereafter, the ceramic dried body was subjected to a peripheral processing process comprising partially cutting off the peripheries thereof using a cylindrical cutting member with a grind stone disposed in a portion including the peripheral portion of a cylindrical base metal part. Thus, a ceramic dried body in which a part of the rectangular pillar was cut off to expose a part of through holes at cut portion as shown in FIGS. 2B and 2C was produced.

(3) At 400° C., the ceramic dried body was kept for 2 hours and degreased. Then, the resultant was kept for 2 hours at 800° C. and sintered to obtain a plurality of honeycomb units having different shapes.

At this time, the temperature was gradually raised with holding and fixing the peripheral portion of the ceramic dried body using a fixing jig having a holding portion of approximately the same shape as the contour of the ceramic dried body so as not to generate warpage in the honeycomb units to be manufactured.

Figure 9:
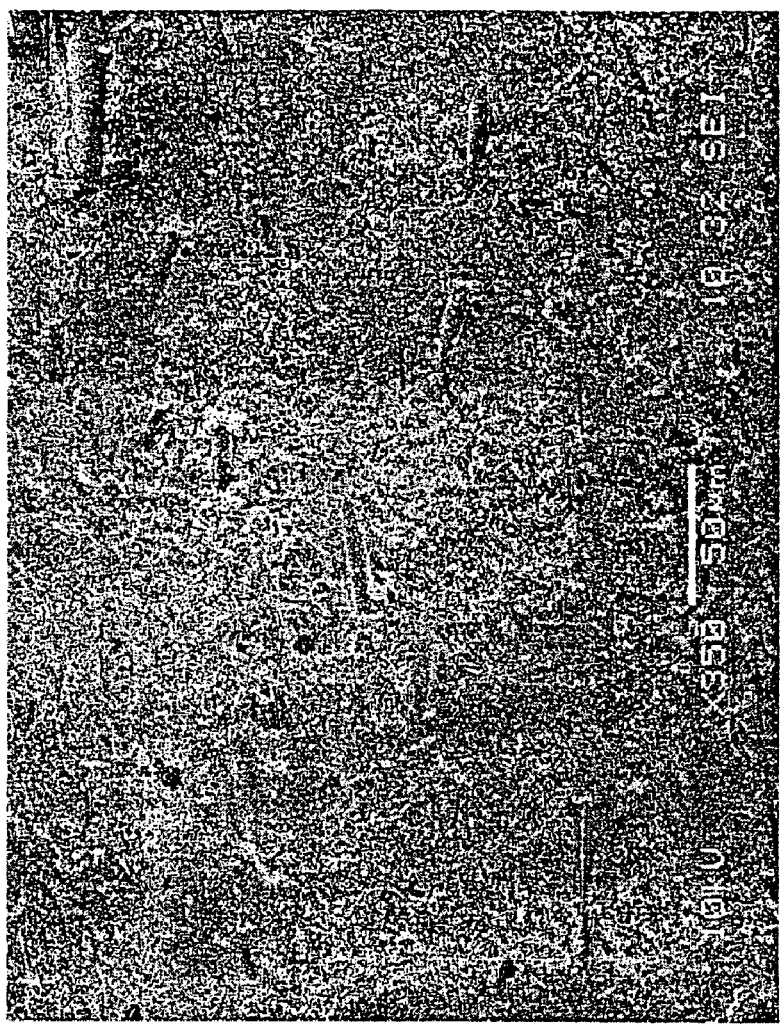
FIG. 9 is a scanning electron microscopy (SEM) photograph of a cell wall of the honeycomb unit according to Example 1.

A scanning electron microscopy (SEM) photograph of a cell wall of the honeycomb unit is shown in FIG. 9.

It is found that, in these honeycomb units, silica-alumina fibers are oriented along the extrusion direction of the material paste.

(4) Next, 29% by weight of γ alumina particles (average particle diameter 2 μm), 7% by weight of silica-alumina fibers (average fiber diameter 10 μm, average fiber length 100 μm), 34% by weight of silica sol (solid concentration 30% by weight), 5% by weight of carboxymethyl cellulose and 25% by weight of water were mixed to prepare a sealing material paste having heat resistance. Using this sealing material paste, a number of the above honeycomb units of plural kinds were bound, and then said sealing material (adhesive) paste was dried to produce a round pillar-shaped honeycomb block.

For the thus produced honeycomb block, M2 was determined using a three dimensional measurement apparatus (BH-V 507 manufactured by Mitsutoyo Corp.) in the same manner as described in the above embodiment with the honeycomb structured body of the present invention, and found to be 0.0 mm.

Then, grinding process was performed to the peripheral face of the honeycomb block, and M2 was made to 0.5 mm.

(5) Thereafter, by forming a sealing material layer (coating layer) having the same composition as the above sealing material (adhesive) paste and having a shape along with irregularities formed on the peripheral face of the honeycomb block, on the peripheral face of said honeycomb block, a honeycomb structured body comprising honeycomb blocks in which a number of honeycomb units comprising silicon carbide are bound through a sealing material layer (adhesive layer) and irregularities are formed on the peripheral face was manufactured.

For the thus manufactured honeycomb structured body, M1 was determined using a three dimensional measurement apparatus in the same manner as described in the above honeycomb block, and found to be 0.0 mm with no irregularities.

Then, the sealing material layer (coating layer) was processed so as to form irregularities on the honeycomb structured body, and M1 was made to 0.3 mm.

Additionally, in the honeycomb structured body manufactured in this Example, the area of the cross-section perpendicular to the longitudinal direction of the honeycomb unit was 11.8 $cm^2$, and the total of the areas of the cross-sections perpendicular to the longitudinal direction of the honeycomb structured body accounted for 93.5% of the cross-section perpendicular to the longitudinal direction of said honeycomb structured body.

Examples 2 to 11, Reference Examples 1 to 4, and Comparative Examples 1 to 12

In the same manner as in Example 1, the resultant honeycomb block and honeycomb structured body were processed to adjust irregularities on the surfaces thereof to manufacture a honeycomb structured body (honeycomb block) having M1 and M2 values as shown in Table 1.

Meanwhile, in Examples 10 to 11, a honeycomb block was formed in the same manner as in Example 1 except for using, as the sealing material (adhesive) paste, a heat resistant sealing material (adherent) paste containing 30% by weight of alumina fibers having a fiber length of 20 μm, 21% by weight of silicon carbide particles having an average particle size of 0.6 μm, 15% by weight of silica sol, 5.6% by weight of carboxymethyl cellulose and 28.4% by weight of water, and the resultant honeycomb block was processed, to manufacture and process a honeycomb structured body.

Further, in Comparative Example 1, a honeycomb structured body was manufactured in the same manner as in Example 1, except that the resultant honeycomb block and honeycomb structured body were not processed.

[Evaluation Test 1: Thermal Shock Test]

Each of the honeycomb structured bodies according to Examples 1 to 11, Reference Examples 1 to 4, and Comparative Examples 1 to 12 was placed into an electric furnace, and the temperature was raised to a target temperature at the rate of 20° C./min, kept at 600° C. or 800° C. for 1 hour, and then cooled to ordinary temperature. The presence/absence of cracks in the honeycomb structured bodies was visually observed. The results of the observation are shown in Table 1.

[Evaluation Test 2: Push-Out Strength Measurement]

Each of the honeycomb structured body according to Examples 1 to 11, Reference Examples 1 to 4, and Comparative Examples 1 to 12 was wrapped with a non-expansive alumina fiber mat (MAFTEC, manufactured by Mitsubishi Chemical Corp.) having a thickness of 7 mm, and inserted into a cylindrical metal case, and push-out load was then imposed by the Instron machine, to measure strength with which the honeycomb structured body was pushed out. The results of the measurement are shown in Table 1.

TABLE 1

| | M1 (mm) | M2 (mm) | Thermal shock test (600° C.) | Thermal shock test (800° C.) | Push-out strength (Kg) |
|---|---|---|---|---|---|
| Example 1 | 0.3 | 0.5 | Without crack | Without crack | 15.0 |
| Example 2 | 0.3 | 3.5 | Without crack | Without crack | 15.0 |

TABLE 1-continued

| | M1 (mm) | M2 (mm) | Thermal shock test (600° C.) | Thermal shock test (800° C.) | Push-out strength (Kg) |
|---|---|---|---|---|---|
| Example 3 | 0.3 | 7.0 | Without crack | Without crack | 17.0 |
| Example 4 | 1.5 | 0.5 | Without crack | Without crack | 17.0 |
| Example 5 | 1.5 | 3.5 | Without crack | Without crack | 17.0 |
| Example 6 | 1.5 | 7.0 | Without crack | Without crack | 17.0 |
| Example 7 | 3.0 | 0.5 | Without crack | Without crack | 15.0 |
| Example 8 | 3.0 | 3.5 | Without crack | Without crack | 15.0 |
| Example 9 | 3.0 | 7.0 | Without crack | Without crack | 15.0 |
| Example 10 | 0.3 | 0.5 | Without crack | Without crack | 15.0 |
| Example 11 | 1.5 | 7.0 | Without crack | Without crack | 17.0 |
| Reference Example 1 | 3.5 | 0.5 | Without crack | With crack | 10.0 |
| Reference Example 2 | 3.5 | 3.5 | Without crack | With crack | 10.0 |
| Reference Example 3 | 3.5 | 7.0 | Without crack | With crack | 10.0 |
| Reference Example 4 | 3.5 | 8.0 | Without crack | With crack | 10.0 |
| Comparative Example 1 | 0.0 | 0.0 | With crack | With crack | 7.0 |
| Comparative Example 2 | 0.0 | 0.5 | With crack | With crack | 7.0 |
| Comparative Example 3 | 0.0 | 3.5 | With crack | With crack | 7.0 |
| Comparative Example 4 | 0.0 | 7.0 | With crack | With crack | 7.0 |
| Comparative Example 5 | 0.0 | 8.0 | With crack | With crack | 7.0 |
| Comparative Example 6 | 0.3 | 0.0 | With crack | With crack | 15.0 |
| Comparative Example 7 | 0.3 | 8.0 | With crack | With crack | 15.0 |
| Comparative Example 8 | 1.5 | 0.0 | With crack | With crack | 17.0 |
| Comparative Example 9 | 1.5 | 8.0 | With crack | With crack | 17.0 |
| Comparative Example 10 | 3.0 | 0.0 | With crack | With crack | 15.0 |
| Comparative Example 11 | 3.0 | 8.0 | With crack | With crack | 15.0 |
| Comparative Example 12 | 3.5 | 0.0 | With crack | With crack | 10.0 |

As apparent from the results shown in Table 1, the honeycomb structured bodies according to Examples 1 to 11 had large push-out strength exceeding 15 kg, and even with thermal shock applied, no cracks or the like are generated in the vicinity of the peripheral faces of the honeycomb structured bodies according to Examples 1 to 11.

On the other hand, some of the honeycomb structured bodies according to Comparative Examples 1 to 12 had low push-out strength, and even those which had large push-out strength, they were vulnerable to thermal shock.

Example 12

Next, a honeycomb structured body was manufactured in which a center-of-gravity $c_2$ of a honeycomb block and a center-of-gravity $c_1$ of a honeycomb structured body were displaced from each another.

Specifically, in the same manner as in Example 1, a honeycomb structured body with the M2 value set to 0.5 was manufactured, and thereafter a honeycomb structured body with the M2 value set to 0.5 mm was manufactured by change in balance of thickness of the sealing material layer (coating layer).

Examples 13 to 19 and Reference Examples 5 to 6

In the same manner as in Example 12, honeycomb blocks and honeycomb structured bodies having the M1, M2 and c1-c2 values shown in Table 2 were manufactured by changes in thickness of the sealing material layer (coating layer). Also note that, in Examples 18 to 19, the same sealing material (adhesive) paste as in Examples 10 to 11 was used to manufacture honeycomb blocks and honeycomb structured bodies having the M1, M2 and c1-c2 values as shown in Table 2.

In the same manner as in Examples 1 to 11 and the like, the honeycomb structured bodies according to Examples 12 to 19 and Reference Examples 5 to 6 were wrapped with an alumina mat, and then inserted into a cylindrical metal case, on which push-out load was imposed.

Further, the resultant honeycomb structured bodies were heat-treated in an electric furnace at 600° C. for 30 hours, and then push-out strength was measured as well. It is also noted that the strength decrease rate after heat treatment, shown in Table 2, indicates a rate of push-out strength after heat treatment to push-out strength before heat treatment in percentage.

TABLE 2

| | M1 (mm) | M2 (mm) | Displacement (mm) | Initial push-out strength (kg) | Push-out strength after heat treatment at 600° C. for 30 hours(kg) | Strength decrease rate (%) |
|---|---|---|---|---|---|---|
| Example 12 | 0.5 | 0.5 | 0.1 | 17 | 12.0 | 71 |
| Example 13 | 0.5 | 0.5 | 1.0 | 17 | 13.0 | 76 |
| Example 14 | 0.5 | 0.5 | 3.0 | 17 | 15.0 | 88 |
| Example 15 | 0.5 | 0.5 | 5.0 | 17 | 15.5 | 91 |
| Example 16 | 0.5 | 0.5 | 7.0 | 17 | 15.1 | 89 |
| Example 17 | 0.5 | 0.5 | 10.0 | 17 | 13.5 | 79 |
| Example 18 | 0.5 | 0.5 | 3.0 | 17 | 15.0 | 88 |
| Example 19 | 0.5 | 0.5 | 7.0 | 17 | 15.1 | 89 |
| Reference Example 5 | 0.5 | 0.5 | 0.0 | 17 | 6.0 | 35 |
| Reference Example 6 | 0.5 | 0.5 | 11.0 | 17 | 10.0 | 59 |

As shown in Table 2, in each of Examples 12 to 19, the strength decrease rate was 60% or more, or the push-out strength was 60% or more, even after heat treatment, whereas in each of Reference Examples 5 and 6, the strength decrease rate was lower than 60%.

Incidentally, upon manufacturing the honeycomb structured bodies according to Examples 1 to 19, Reference Examples 1 to 6 and Comparative Examples 1 to 12, chipping, crack or the like did not occur in the peripheral face of the honeycomb block.

Example 20

(1) 40% by weight of γ alumina particles (average particle diameter 2 μm), 10% by weight of silica-alumina fibers (average fiber diameter 10 μm, average fiber length 100 μm, aspect ratio 10) and 50% by weight of silica sol (solid concentration 30% by weight) were mixed together. To 100 parts by weight of the obtained mixture were added 6 parts by weight of methyl cellulose as an organic binder, and small amounts of a plasticizer and lubricant, and further mixed and kneaded to obtain a mixed composition. Then, this mixed composition was subjected to extrusion molding using an extrusion molding machine to obtain raw molded bodies.

One of these raw molded bodies was rectangular pillar shape which is approximately the same as the honeycomb unit 20 shown in FIG. 2A, and had the size of 35 mm×35 mm×300 mm, cell density of 31/cm$^2$ and cell wall thickness of 0.35 mm.

Moreover, using the above mixed composition, a ceramic molded body having approximately the same shapes as the honeycomb units 200 and 210 in which a part of the rectangular pillar was cut off with a part of through holes being exposed at cut part as shown in FIGS. 2B and 2C was also produced.

(2) Next, after sufficiently drying the raw molded body using a microwave drier and hot air drier and obtaining a ceramic dried body, which was kept for 2 hours at 400° C. to be degreased. Then, the resultant was kept for 2 hours at 800° C. to be sintered to obtain a plurality of honeycomb units having different shapes.

In the above process for producing honeycomb units from the above ceramic dried body, the ceramic molded body was held and fixed using a fixing jig in which warpage especially remained, to generate warpage in the obtained honeycomb units.

(3) Next, 29% by weight of γ alumina particles (average particle diameter 2 μm), 7% by weight of silica-alumina fibers (average fiber diameter 10 μm, average fiber length 100 μm), 34% by weight of silica sol (solid concentration 30% by weight), 5% by weight of carboxymethyl cellulose and 25% by weight of water were mixed to prepare a sealing material paste having heat resistance. Using this sealing material paste, a number of the honeycomb units of plural kinds were bound, and then the above sealing material (adhesive) paste was dried to produce a round pillar-shaped honeycomb block.

(4) Thereafter, by forming a sealing material layer (coating layer) having the same composition as the above sealing material (adhesive) paste and having a shape along with irregularities formed on the peripheral face of the honeycomb block, on the peripheral face of said honeycomb block, a honeycomb structured body comprising honeycomb blocks in which a number of honeycomb units comprising silicon carbide are bound through a sealing material layer (adhesive layer) and irregularities are formed on the peripheral face, was produced.

Examples 21 to 27 and Reference Examples 7 to 8

Each of honeycomb structured bodies was manufactured, in which the honeycomb unit was made warped in the same manner as in the case of Example 20 to cause displacement from the least square straight line by the values shown in Table 3. It is to be noted that, in Examples 26 to 27, a honeycomb structured body having a value of displacement from the least square straight line as shown in Table 3, was manufactured in the same manner as in Example 20 except for using, as the sealing material (adhesive) paste, a heat resistant sealing material (adhesive) paste containing 30% by weight of alumina fibers having a fiber length of 20 μm, 0.21% by weight of silicon carbide particles having an average particle size of 0.6 μm, 15% by weight of silica sol, 5.6% by weight of carboxymethyl cellulose and 28.4% by weight of water.

With regard to the honeycomb structured bodies thus manufactured in Examples 20 to 27 and Reference Examples 0.7 to 8, using a three dimensional measurement apparatus (BH-V507, manufactured by Mitsutoyo Corp.), a rate of a distance between a center-of-gravity of a cross-sectional curve perpendicular to the longitudinal direction of the honeycomb block and a least square curve to a distance between the center-of-gravity and the outermost point of the cross-sectional curve was measured, at five equally spaced positions in the longitudinal direction of the honeycomb block, by the method described as to the honeycomb structured body of the second aspect of the present invention in the above embodiment. As a result, the measured rate was 0.1.

Each of the honeycomb structured bodies according to Examples 20 to 27 and Reference examples 7 to 8 was wrapped with an aluminum mat and inserted into a metal case, on which push-out load was imposed.

The honeycomb structured bodies were then heat-treated in an electric furnace at 600° C. for 30 hours, and then push-out strength was measured.

TABLE 3

|  | M1 (mm) | M2 (mm) | Displacement from least square straight line(mm) | Initial push-out strength (kg) | Push-out strength after heat treatment at 600° C. for 30 hours(kg) | Strength decrease rate (%) |
| --- | --- | --- | --- | --- | --- | --- |
| Example 20 | 0.5 | 0.5 | 0.1 | 17.0 | 11.8 | 69.0 |
| Example 21 | 0.5 | 0.5 | 1.0 | 17.0 | 13.2 | 78.0 |
| Example 22 | 0.5 | 0.5 | 3.0 | 17.0 | 14.9 | 88.0 |
| Example 23 | 0.5 | 0.5 | 5.0 | 17.0 | 15.3 | 90.0 |
| Example 24 | 0.5 | 0.5 | 7.0 | 17.0 | 14.9 | 88.0 |
| Example 25 | 0.5 | 0.5 | 10.0 | 17.0 | 13.3 | 78.0 |
| Example 26 | 0.5 | 0.5 | 1.0 | 17.0 | 13.2 | 78.0 |

TABLE 3-continued

|  | M1 (mm) | M2 (mm) | Displacement from least square straight line(mm) | Initial push-out strength (kg) | Push-out strength after heat treatment at 600° C. for 30 hours(kg) | Strength decrease rate (%) |
|---|---|---|---|---|---|---|
| Example 27 | 0.5 | 0.5 | 7.0 | 17.0 | 14.9 | 88.0 |
| Reference Example 7 | 0.5 | 0.5 | 0.0 | 17.0 | 5.8 | 34.0 |
| Reference Example 8 | 0.5 | 0.5 | 11.0 | 17.0 | 9.8 | 58.0 |

As shown in Table 3, in each of Examples 20 to 27, the strength decrease rate was 60% or more, whereas in each of Reference Examples 7 to 8, the strength decrease rate was lower than 60%.

What is claimed as new and desired to be secured by Letters Patents of the United States is:

1. A honeycomb structured body comprising:
a pillar-shaped honeycomb block including a honeycomb unit in which a number of cells are longitudinally placed in parallel with a cell wall therebetween; and
a sealing material provided on a peripheral portion of said pillar-shaped honeycomb block,
wherein irregularities are formed on each peripheral face of said honeycomb structured body and said pillar-shaped honeycomb block, and said honeycomb unit comprises inorganic particles, as well as inorganic fibers and/or whiskers, and the inorganic fibers and/or whiskers increase a specific surface area of the honeycomb unit;
when a least square curve is obtained by a least square method on the basis of points comprising the contour of a cross-section perpendicular to the longitudinal direction of said honeycomb structured body, a center-of-gravity of the least square curve is defined as $c_1$, a distance between a minimum concentric circumscribed curve having $c_1$ as the center-of-gravity, derived from said least square curve and the center-of-gravity $c_1$ is defined as D1, a distance between a maximum concentric inscribed curve having $c_1$ as the center-of-gravity, derived from said least square curve and the center-of-gravity $c_1$ is defined as D2, and (D1−D2) is defined as M1, the following inequality is satisfied: about 0.3 mm≦M1; and
when a least square curve is obtained by a least square method on the basis of points comprising the contour of a cross-section perpendicular to the longitudinal direction of said honeycomb block, a center-of-gravity of the least square curve is defined as $c_2$, a distance between a minimum concentric circumscribed curve having $c_2$ as the center-of-gravity, derived from said least square curve and the center-of-gravity $c_2$ is defined as D3, a distance between a maximum concentric inscribed curve having $c_2$ as the center-of-gravity, derived from said least square curve and the center-of-gravity $c_2$ is defined as D4, and (D3−D4) is defined as M2, the following inequality is satisfied: about 0.5 mm≦M2≦about 7.0 mm.

2. The honeycomb structured body according to claim 1, wherein said M1 is about 3.0 mm or less.

3. The honeycomb structured body according to claim 1, wherein the center-of-gravity $c_1$ does not correspond to the center-of-gravity $c_2$.

4. The honeycomb structured body according to claim 3, wherein a distance between the center-of-gravity $c_1$ and the center-of-gravity $c_2$ is at least about 0.1 mm and at most about 10.0 mm.

5. The honeycomb structured body according to claim 1, wherein when the centers-of-gravities $c_2$ of the least square curves are obtained at three points or more along the longitudinal direction of said honeycomb block, at least one of the centers-of-gravities $c_2$ are not present in a same straight line parallel to the longitudinal direction of said honeycomb block.

6. The honeycomb structured body according to claim 1, wherein when the centers-of-gravities $c_1$ of the least square curves are obtained at three points or more along the longitudinal direction of said honeycomb structured body, at least one of the centers-of-gravities $c_1$ are not present in a same straight line parallel to the longitudinal direction of said honeycomb structured body.

7. The honeycomb structured body according to claim 5, wherein at the time when a least square method is applied for said centers-of-gravities $c_2$ of at least three points or more, the obtained straight line is defined as a least square straight line, and when the distance between said least square straight line and the respective centers-of-gravities $c_2$ is defined as r, while the distance between said respective centers-of-gravities $c_2$ and the outermost point of the least square curve with $c_2$ as a center-of-gravity is defined as D, a ratio of r to D (r/D) is at least about 0.1% and at most about 3%.

8. The honeycomb structured body according to claim 1, wherein said honeycomb block is configured by binding a plurality of the honeycomb units together.

9. The honeycomb structured body according to claim 8, wherein said plurality of honeycomb units comprise honeycomb units in which a peripheral processing is carried out to provide a plurality of honeycomb units having different cross-sectional shapes.

10. The honeycomb structured body according to claim 8, wherein said plurality of honeycomb units comprise honeycomb units in which an extrusion molding is carried out to provide a plurality of honeycomb units having different cross-sectional shapes.

11. The honeycomb structured body according to claim 1, wherein said honeycomb unit has a cross-section perpendicular to the longitudinal direction of said honeycomb unit itself, the area of said cross-section is at least about 5 $cm^2$ and at most about 50 $cm^2$.

12. The honeycomb structured body according to claim 8, wherein the total sum of the areas of cross-section areas of said honeycomb units on the cross section perpendicular to the longitudinal direction of said honeycomb units accounts for about 85% or more of the area of the cross-section of said honeycomb structured body perpendicular to the longitudinal direction of said honeycomb structured body.

13. The honeycomb structured body according to claim 1, wherein said inorganic particles comprises at least one kind selected from the group consisting of alumina, silica, zirconia, titania, ceria, mullite and zeolite.

14. The honeycomb structured body according to claim 1, wherein the amount of said inorganic particles contained in said honeycomb unit is at least about 30% and at most about 97% by weight.

15. The honeycomb structured body according to claim 1, wherein said inorganic fibers and/or whiskers comprises at least one kind selected from the group consisting of alumina, silica, silicon carbide, silica alumina, glass, potassium titanate and aluminum borate.

16. The honeycomb structured body according to claim 1, wherein the total amount of said inorganic fibers and/or whiskers contained in said honeycomb unit is at least about 3% and at most about 70% by weight.

17. The honeycomb structured body according to claim 1, wherein said honeycomb unit further contains an inorganic binder.

18. The honeycomb structured body according to claim 17, wherein said inorganic binder comprises at least one kind selected from the group consisting of alumina sol, silica sol, titania sol, water glass, sepiolite and attapulgite.

19. The honeycomb structured body according to claim 1, wherein a catalyst is supported thereon.

20. The honeycomb structured body according to claim 19, wherein said catalyst comprises at least one kind selected from the group consisting of a noble metal, alkali metal, alkaline earth metal and oxide.

21. An exhaust gas converting apparatus, wherein the honeycomb structured body according to claim 1 is installed in a casing connected to an exhaust passage of an internal combustion engine through a mat-like holding sealing material.

22. The exhaust gas converting apparatus according to claim 21, wherein said mat-like holding sealing material comprises a non-expansive ceramic fiber mat.

23. The exhaust gas converting apparatus according to claim 22, wherein said mat-like holding sealing material further comprises alumina and/or silica.

* * * * *